(12) United States Patent
Goh et al.

(10) Patent No.: US 8,705,900 B2
(45) Date of Patent: Apr. 22, 2014

(54) OPTICAL MODULATOR

(75) Inventors: Takashi Goh, Atsugi (JP); Takashi Yamada, Atsugi (JP); Hiroshi Yamazaki, Atsugi (JP); Yoshiyuki Doi, Atsugi (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 84 days.

(21) Appl. No.: 13/635,845

(22) PCT Filed: Mar. 18, 2011

(86) PCT No.: PCT/JP2011/001652
§ 371 (c)(1),
(2), (4) Date: Sep. 18, 2012

(87) PCT Pub. No.: WO2011/114753
PCT Pub. Date: Sep. 22, 2011

(65) Prior Publication Data
US 2013/0011093 A1    Jan. 10, 2013

(30) Foreign Application Priority Data
Mar. 19, 2010    (JP) .................................. 2010-065292

(51) Int. Cl.
*G02F 1/035* (2006.01)
*G02F 1/225* (2006.01)
*H04B 10/54* (2013.01)

(52) U.S. Cl.
CPC ................ *G02F 1/225* (2013.01); *H04B 10/54* (2013.01)
USPC ..................... 385/3; 385/2; 398/188; 398/192

(58) Field of Classification Search
CPC ... G02F 1/225; G02F 1/2255; G02F 2001/21; G02F 2001/212; H04B 10/54; H04B 10/541; H04B 10/548; H04B 10/556; H04B 10/505; H04B 10/5051; H04B 10/5053
USPC .......... 385/2, 3; 398/152, 184, 188, 192, 194, 398/198
See application file for complete search history.

(56) References Cited

U.S. PATENT DOCUMENTS 7,925,171 B2 * 4/2011 Ooi et al. ...................... 398/198
8,306,431 B2 * 11/2012 Takahara ...................... 398/152
(Continued)

FOREIGN PATENT DOCUMENTS

EP          1130817      5/2001
EP        1 130 817      9/2001
(Continued)

OTHER PUBLICATIONS

International Preliminary Report on Patentability dated Sep. 25, 2012 from related International application No. PCT/JP2011/001652.

(Continued)

*Primary Examiner* — Ellen Kim
(74) *Attorney, Agent, or Firm* — Workman Nydegger

(57) ABSTRACT

Disclosed is an optical modulator which substantially lowers loss and has little attenuation in the intensity of an optical signal after modulation. The optical modulator includes a 1×2 RZ pulse carver wherein optical phase shifters used for modulation are arranged along two arm waveguides held between a 1×2 coupler and a 2×2 coupler, two interferometric modulators connected respectively to two output ports of the 2×2 coupler, and a 2×1 coupler for combining the outputs of the interferometric modulators.

17 Claims, 17 Drawing Sheets

(56) References Cited

U.S. PATENT DOCUMENTS

| | | | |
|---|---|---|---|
| 8,320,772 B2 * | 11/2012 | Ooi et al. | 398/192 |
| 2003/0147591 A1 | 8/2003 | Doi | |
| 2009/0041473 A1 * | 2/2009 | Nishihara et al. | 398/188 |

FOREIGN PATENT DOCUMENTS

| | | |
|---|---|---|
| EP | 1335242 | 8/2003 |
| JP | 2001-257645 | 9/2001 |
| JP | 2003-233047 | 8/2003 |
| JP | 2009-204753 | 9/2009 |

OTHER PUBLICATIONS

International Search Report issued Apr. 19, 2011 in PCT Application No. PCT/JP2011/001652, filed Mar. 18, 2011.

* cited by examiner

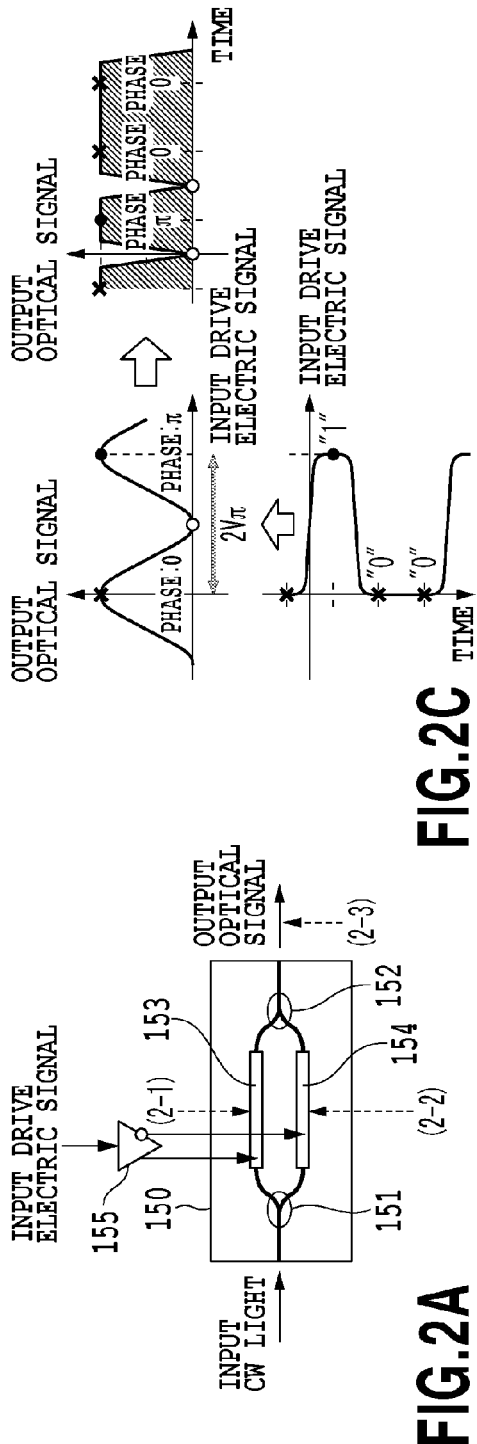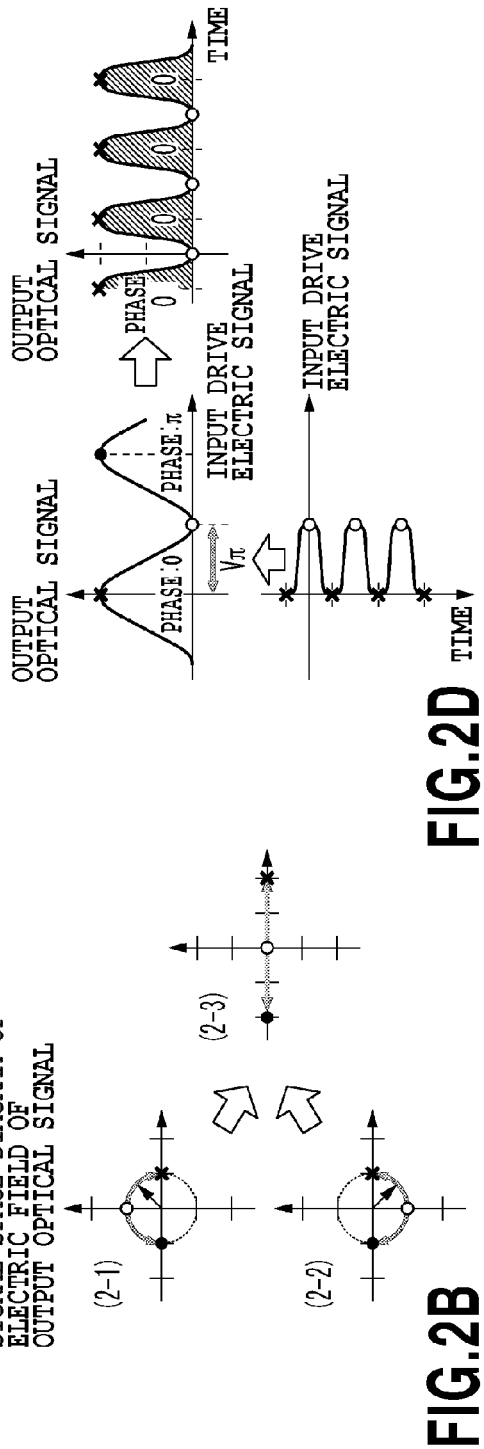

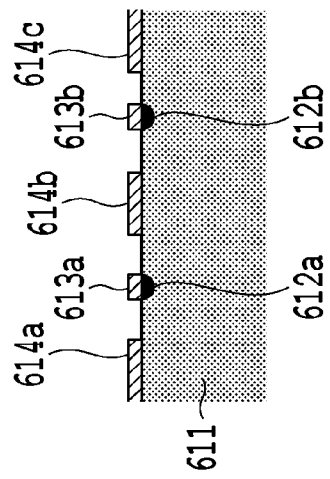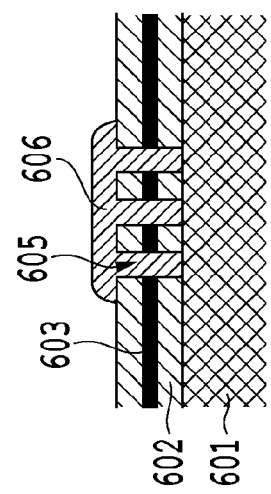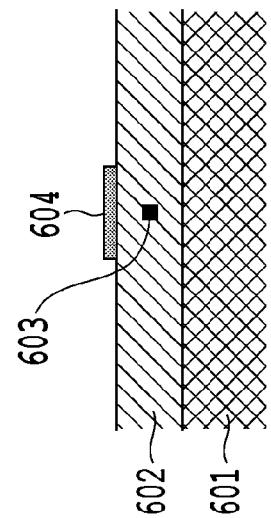

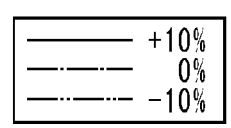
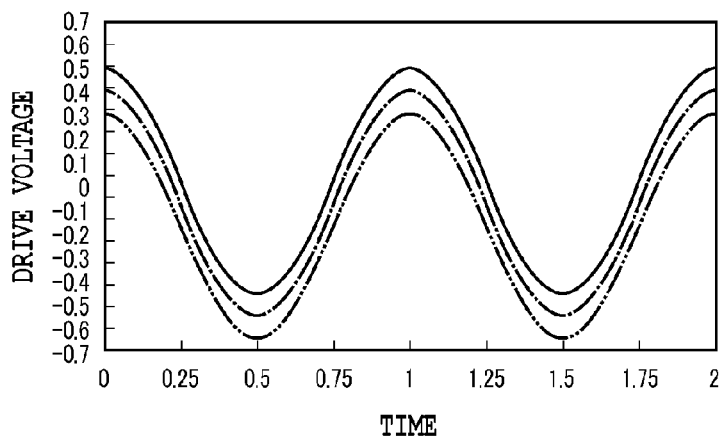
FIG.17A
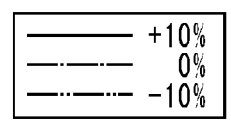
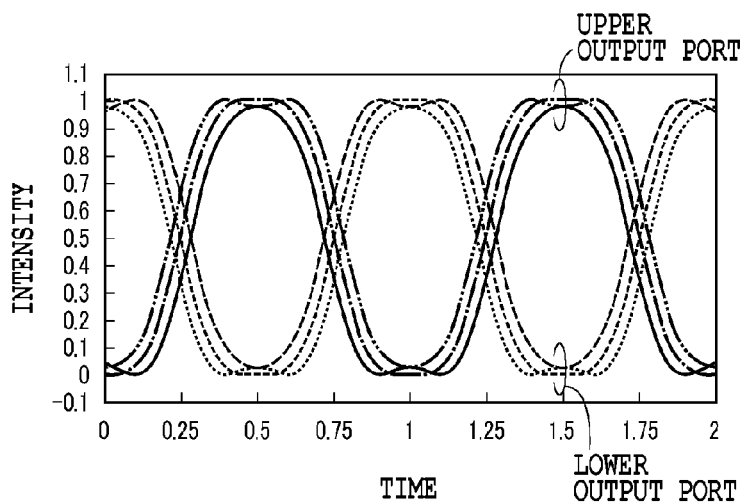
FIG.17B
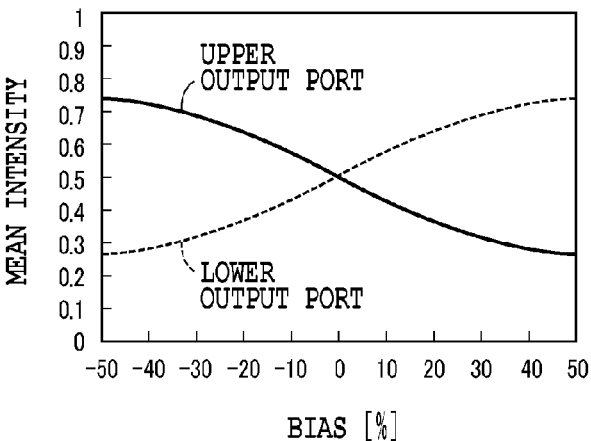
FIG.17C

OPTICAL MODULATOR

TECHNICAL FIELD

The present invention relates to an optical modulator, and more particularly relates to an optical modulator that includes a QPSK modulator or a DQPSK modulator and an RZ pulse carver.

BACKGROUND ART

An optical modulator is an important device used to convert an electric signal into an optical signal on an optical communication network, etc. Several optical modulation methods are employed, such as a method for directly blinking emission of a light source, a method for changing the transmittance of a medium that passes light, and a method for changing interference output by controlling the optical phase of an optical interferometer. Among these methods, the method that uses an optical interferometer has a feature of that the signal spectral band width of a modulated optical signal output is narrow. As a major modulation method, the method that uses an optical interferometer is employed, especially for long distance transmission having a problem that residual dispersion causes broadening of waveforms, and for wavelength division multiplexing transmission for transmitting many wavelength channels at high density. An optical interferometric modulator in practical use consist of optical waveguides (LN waveguide) that was formed by titanium diffusion on a lithium niobate ($LiNbO_3$: LN) substrate with large electro-optic effects. The optical phase control is performed by applying the voltage of an electric signal to electrodes located in the vicinity of the waveguide.

For a transmission rate of up to about 10 Gbps for a wavelength channel, a modulated signal by on-off intensity keying with a binary-value basis is used. For transmission at a higher rate beyond 10 Gbps, a multi-level modulated signal provided by using phase information as well as the amplitude of the optical signal, and/or a polarization-multiplexed signal provided by multiplexing a signal using polarization, is employed in order to efficiently transmit multiple bits with one symbol. For transmission performed at 40 Gbps, Differential Quadrature Phase-Shift Keying (DQPSK) has already been practically used, whereby data consisting of two bits can be transmitted using one symbol. For transmission at the rate of 100 Gbps for which practical use is anticipated, polarization-multiplexed QPSK that employs polarization multiplexing is also being studied as one of the major candidates. A difference between QPSK modulation and DQPSK modulation is that in QPSK modulation, a sign is allocated for the phase value of each symbol, while in DQPSK modulation, a sign is allocated to a phase change value with respect to a preceding symbol. However, from the viewpoint that signals are modulated and assigned to four optical phases, these two techniques are alike, and the configuration of a modulator and the physical modulation method employed for both these techniques do not differ.

FIG. 1 illustrates the configuration of a conventional optical modulator. Here, to perform the high-speed signal transmission described above, RZ (Return To Zero) pulse carving, for isolating/standardizing the intensity-modulated waveforms of the individual symbols, is frequently employed, based on the viewpoint that the suppression of nonlinearity be performed during signal transmission and that the suppression of chirp be performed during inter-symbol transition. As shown in FIG. 1, in a conventional optical modulator 100, a DQPSK modulator 110 and an RZ pulse carver 120 are connected by a polarization-maintaining optical fiber 132.

The DQPSK modulator 110 is a modulator having a nested structure (a nested MZI modulator), wherein an I-channel MZI modulator 113 and a Q-channel MZI modulator 114 are respectively inserted into two main arm waveguides held between a 1×2 coupler 111 and a 2×1 coupler 112. A π/2 phase shifter (a variable phase shifter) 115 is inserted into at least one of the two arm waveguides. The I-channel MZI modulator 113 and the Q-channel MZI modulator 114 are common Mach-Zehnder interferometric modulators, respectively, wherein two individual arm waveguides held by a 1×2 coupler and a 2×1 coupler include a phase shifter for modulation. The phase shifter for modulation provided for the I-channel MZI modulator 113 is driven with a data signal (a Data I signal), and the phase shifter for modulation provided for the Q-channel MZI modulator 114 is driven with another data signal (a Data Q signal).

The RZ pulse carver 120 is a common single Mach-Zehnder interferometric modulator (MZI modulator), wherein phase shifters 123 and 124 for modulation are respectively provided for two arm waveguides held by a 1×2 coupler 121 and a 2×1 coupler 122. The phase shifters 123 and 124 for modulation are driven with a clock signal (a CLK signal).

A continuous wave (CW) light is input at an input optical fiber 131 connected to the DQPSK modulator 110, and an RZ-pulse-format DQPSK signal (an RZ-DQPSK signal) is output by an output optical fiber 133 connected to the RZ pulse carver 120.

While referring to FIGS. 2A to 2D, the operating principle of the Mach-Zehnder interferometric modulator will be described. Here, it is assumed that the modulator is an LN modulator formed by using a Z-cut substrate; however, when an X-cut substrate is employed for a modulator, basically the same operation is performed. An MZI modulator shown in FIG. 2A includes phase shifters 153 and 154 respectively provided for two arm waveguides that are held by a 1×2 coupler 151 and a 2×1 coupler 152. When a Z-cut substrate is employed, a so-called push-pull operation is performed, wherein a drive electrical signal $V_{drv}$ is input, as $+V_{drv}/2$ to the phase shifter 153 for modulation and as $-V_{drv}/2$ to the phase shifter 154 for modulation. It should be noted that when an X-cut substrate is employed, a drive electrode is arranged between the two arm waveguides. When a drive electrical signal is applied to the electrode, an electric field is applied, in opposite directions from each other, to the upper and lower phase shifters for modulation, and that therefore, a push-pull operation is automatically performed.

The input CW light is split into two beam lights by the 1×2 coupler 151, the lights are modulated in phase by the phase shifters 153 and 154 respectively of the two arm waveguides, and the lights are coupled by the 2×1 coupler 152. At this time, the phase of the output optical signal in the electric field changes, as shown in FIG. 2B. Then, since the light transmitted via the phase shifter 153 is affected by positive phase modulation, the trajectory of the field vector is counterclockwise (x→○→●) (2-1). Whereas, the light transmitted via the phase shifter 154 is affected by negative phase modulation, and the trajectory of the field vector is clockwise (x→○→●) (2-2). The field vector of the output optical signal is obtained as resultant vector of these vectors, and thus, the trajectory of the output optical signal is a linear trajectory along the real axis (2-3).

At this time, when the phase shifters are driven with a Data signal to change a phase difference for the arm waveguides by 2π, as shown in FIG. 2C, the phase of the output light is changed to phases 0 and π. The intensity of the signal for the single MZI modulator is unchanged, and the modulator serves as a phase modulator that outputs two phase values.

FIG. 3 shows the intensity waveform of an optical signal and the phase of the optical signal in the electrical field according to the conventional optical modulator. When CW light is input to the optical modulator 100 in FIG. 1 (1-1), the CW light is split by the 1×2 coupler 111 (1-2 and 1-3), and the split lights are transmitted to the I-channel MZI modulator 113 and the Q-channel MZI modulator 114. As shown in FIG. 2C, the modulated optical signals (1-4 and 1-5), which have two phase values are output by the I-channel MZI modulator 113 and the Q-channel MZI modulator 114. In this drawing, to simplify the explanation, the same modulation pattern "1 0 0 . . . " is employed both for the I channel and the Q channel; however, for the actual modulation operation, the same pattern is not always employed. The modulated signals are coupled, with a phase difference of 90° (1-6), while a quarter wavelength is employed as the optical path difference between the I channel and the Q channel. As a result, as shown in (1-7), a QPSK optical signal modulated using four phase values is obtained as an optical signal to be output. It should be noted that for QPSK modulation performed by the nested MZI modulator, a fundamental loss of 3 dB occurs due to the coupling process performed with a phase difference of 90°.

When the phase shifters are driven with a CLK signal to change the phase difference of the arm waveguides by π, as shown in FIG. 2D, the phase of the output light is unchanged. The single MZI modulator serves as a pulse carver for generating a solitary pulse, for which each of the intensity-modulated waveforms of the pulses in an optical signal is uniform. Therefore, when this pulse carver is employed as the RZ pulse carver 120 of the optical modulator 100 in FIG. 1, as shown in (1-8) in FIG. 3, the individual symbols can be formed as solitary pulses having the same intensity-modulated waveform, while the optical phase information for the DQPSK modulated optical signal is maintained. It should be noted that the RZ pulse carving performs waveform shaping by attenuating an optical waveform, so that the reduced portion of the waveform is regarded as a fundamental loss. In a case wherein waveform shaping is performed to obtain a RZ pulse at a duty ratio of 50%, a fundamental loss of 3 dB occurs.

For an LN waveguide, a phenomenon called "DC bias drift" occurs that, when a voltage is being applied for a long time, a charge-up phenomenon and the like occurs and causes the refractive index of the waveguide and an interference condition to be shifted. Further, a phenomenon called "temperature drift" occurs by which the refractive index is also shifted, due to an environmental temperature. For the MZI modulators, such as the child MZI modulators (the I-channel MZI modulator 113 and the Q-channel MZI modulator 114 in FIG. 1) in the nested structure and the RZ pulse carver, shifting of the interference condition appears as a shift of an operating point. For the parent MZI of the nested MZI modulator, a relative phase shift in orthogonality for the I-channel/Q-channel optical signals appears, i.e., a shift from a phase difference of 90°. Since these shifts are undesirable, because the quality of the optical signal is deteriorated, it is required that appropriate monitoring means be employed to detect, and compensate for/adjust the amount of shift.

To perform compensation for the shift of the operating point of the MZI modulator, an electrical circuit that combines a high frequency signal component, called a Bias-T, with a direct-current bias component is inserted at the front stage for high frequency input, and a bias voltage is applied to a modulated signal. As another method, a dedicated bias electrode, for compensating for/adjusting the operating point, is provided separately from the high frequency electrode, and a bias voltage is applied to the bias electrode to perform compensation.

To perform a 90° phase adjustment using the parent MZI, a variable phase shifter 115 arranged in the parent MZI in FIG. 1 is employed to adjust the relative phase for the I-channel/Q-channel optical signals.

To monitor a shift of the operating point and a shift in orthogonality, generally, a monitor output branched at an optical tap and the like is provided for the output port of each modulator to monitor the optical output. Specifically, the monitoring device for the DQPSK is arranged at the rear of the 2×1 coupler 112, and the monitoring device for the RZ pulse carver is arranged at the rear of the 2×1 coupler 122.

However, for RZ pulse carving as described above, since an optical signal passes the MZI modulators connected at multiple stages, an insertion loss is increased, and a fundamental loss of about 3 dB occurs while RZ pulse carving is being performed. Therefore, a problem arises that the intensity of the modulated optical signal is significantly attenuated.

SUMMARY OF INVENTION

One objective of the present invention is to provide an optical modulator, for which, substantially, the insertion loss is low and the attenuation of the intensity of a modulated optical signal is low.

To achieve this objective, one embodiment of the present invention is characterized by comprising: a 1×2 RZ pulse carver wherein optical phase shifters used for modulation are arranged along two arm waveguides held between a 1×2 coupler and a 2×2 coupler; two interferometric modulators connected respectively to two output ports of the 2×2 coupler; and a 2×1 coupler, for combining the output signals of the interferometric modulators.

A pulsed signal used to drive the 1×2 RZ pulse carver can be a pulsed signal having an amplitude of Vπ and a repetition period CLK wherein a drive waveform f(t) satisfies a relationship whereof $$f(t-\text{CLK}/2) = -f(t) \tag{Expression 1}.$$

The pulsed signal used to drive the 1×2 pulse carver can be a pulsed signal having an amplitude of 2Vπ and a repetition period CLK, for which when a drive waveform f(t) is $$F(t) = \text{Abs}\{f(t) - V\pi/2\} - V\pi/2, \text{ or}$$

$$F(t) = \text{Abs}\{f(t) + V\pi/2\} - V\pi/2 \tag{Expression 2},$$

the drive waveform f(t) satisfies a relationship whereof $$F(t-\text{CLK}/2) = -F(t) \tag{Expression 3}.$$

The interferometric modulator may be a data modulator including phase shifters used for modulation that are arranged along two arm waveguides held between an output port of the 2×2 coupler provided in the 1×2 RZ pulse carver and a combining coupler, and the optical modulator may include a π/2 phase shifters for adjusting to 90° a relative optical phase for signals output by the individual interferometric modulators.

The interferometric modulator may include Mach-Zehnder interferometric modulators that are arranged along two arm waveguides held between an output port of the 2×2 coupler provided in the 1×2 RZ pulse carver and a polarization combiner, wherein the Mach-Zehnder interferometric modulators are data modulators for each of which phase shifters are arranged, along two arm waveguides held between a splitting coupler and a combining coupler, and the optical modulator may include a TE/TM polarization converter and the polarization combiner.

As described above, according to the present invention, since a structure with one input port and two output ports is employed for an RZ pulse carver, a modulator can be obtained that avoids a fundamental loss caused by pulse carving.

Further, since a drive waveform for the RZ pulse carver has upper lower symmetry (Expression 1) with the amplitude $V\pi$, the waveforms having the same shape are output at the two output ports of the 1×2 RZ pulse carver, and an appropriate modulated signal can be obtained. Furthermore, when this drive waveform is shaped as a sine wave, spectral line broadening of the modulated signal that is output can be minimized.

Moreover, when the drive waveform of the RZ pulse carver is operated with the amplitude of $2V\pi$, so long as (Expressions 2 and 3) are established, the same waveforms are obtained at the two outputs of the 1×2 RZ pulse carver, and an appropriately modulated signal can be obtained. Also, when a triangular wave having an amplitude center of $+V\pi/2$ or $-V\pi/2$ is employed as a drive waveform, spectral line broadening of an output modulated signal can be minimized.

When interferometric modulators are employed as an I-channel MZI modulator and a Q-channel MZI modulator, and $\pi/2$ phase shifters are provided, an RZ-DQPSK modulator can be obtained that can avoid a fundamental loss caused by pulse carving.

When interferometric modulators are employed as an X-polarization QPSK modulator and a Y-polarization QPSK modulator, and an I-channel MZI modulator and a Q-channel MZI modulator are provided for each of these modulators to form nested MZI modulators, an RZ polarization-multiplexed QPSK modulator can be obtained.

In order to cancel the temperature dependence of the refractive indices of waveguides, a material showing the opposite sign for the temperature dependence of the refractive index is inserted into the waveguide circuit, and thus, a modulator can be provided, for which a phase difference of a delay circuit can be provided that has a low temperature dependence.

BRIEF DESCRIPTION OF DRAWINGS

FIG. 2A is a diagram for explaining the operating principle of a Mach-Zehnder interferometric modulator;

FIG. 2B is a diagram for explaining the operating principle of the Mach-Zehnder interferometric modulator;

FIG. 2C is a diagram for explaining the operating principle of the Mach-Zehnder interferometric modulator;

FIG. 2D is a diagram for explaining the operating principle of the Mach-Zehnder interferometric modulator;

FIG. 14A is a cross-sectional view of a thermo-optic phase shifter according to the first example;

FIG. 14B is a cross-sectional view of a delay circuit according to the first example;

FIG. 14C is a cross-sectional view of a modulator array according to the first example;

FIG. 17A is a diagram for explaining a method for adjusting a bias point of a 2×1 RZ pulse carver;

FIG. 17B is a diagram for explaining the method for adjusting the bias point of the 2×1 RZ pulse carver; and FIG. 17C is a diagram for explaining the method for adjusting the bias point of the 2×1 RZ pulse carver.

DESCRIPTION OF EMBODIMENTS

The embodiments of the present invention will now be described in detail while referring to drawings.

First Embodiment

DQPSK Modulator that Includes an RZ Pulse Carver; $V\pi$-drive

Figure 4:
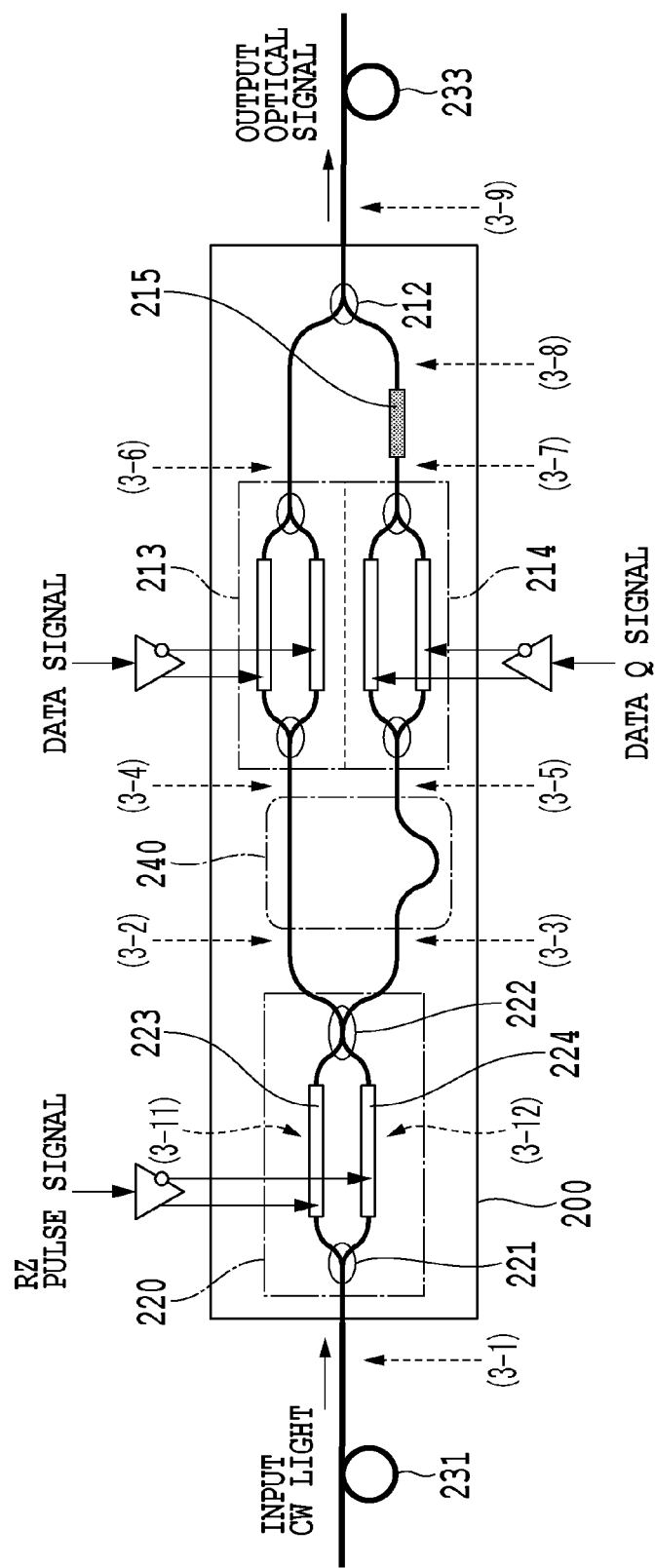
FIG. 4 is a diagram illustrating the configuration of a DQPSK modulator that includes an RZ pulse carver according to a first embodiment of the present invention.

FIG. 4 shows the configuration of a DQPSK modulator that includes an RZ pulse carver according to a first embodiment of the present invention. An optical modulator 200 includes: a 1×2 RZ pulse carver 220 including phase shifters 223 and 224 used for modulation are arranged along two arm waveguides held between a 1×2 coupler 221 and a 2×2 coupler 222; a delay circuit 240 for inserting a delay into one of two outputs (the Q channel output, referring to FIG. 4) of the 1×2 RZ pulse carver 220, wherein the delay corresponds to half of a modulation symbol rate; and a DQPSK modulator.

The DQPSK modulator includes: an I-channel modulator 213 and a Q-channel modulator 214 that are data modulators including phase shifters arranged along two arm waveguides held between a 1×2 coupler and a 2×1 coupler; and a 2×1 coupler 212 that couples the output signals of the two data modulators. The individual input ports of the I-channel modulator 213 and the Q-channel modulator 214 are connected via the delay circuit 240 to the two output ports of the 1×2 RZ pulse carver 220. A π/2 phase shifter 215 is inserted at the output port of either the I-channel modulator 213 or the Q-channel modulator 214 in order to adjust a relative phase shift to 90° between a signal output by the I-channel modulator 213 and a signal output by the Q-channel modulator 214. It should be noted that 2×2 couplers may be employed as replacements for 1×2 couplers and 2×1 couplers by not connecting a main signal path to unnecessary ports.

When the optical modulator 200 in the first embodiment is compared with the conventional optical modulator 100, which is provided by simply connecting an RZ pulse carver to a DQPSK modulator, the optical modulator 200 of this embodiment differs greatly, in that a 2×2 coupler is employed instead of the output side 2×1 coupler of the RZ pulse carver and is also employed as the input side 1×2 coupler of the DQPSK modulator, and that a delay circuit is arranged on one of the arm waveguides of the DQPSK modulator.

The operation of the optical modulator of the first embodiment will now be described. First, the operation of the 1×2 RZ pulse carver 220 will be described. Assume a CLK signal having an amplitude Vπ is input as an RZ pulse signal to drive the phase shifters 223 and 224 used for modulation (a Vπ-drive operation). The 1×2 coupler 221 splits input light CW, the phase shifters 223 and 224 which are used for modulation perform phase modulation for each split light, and the 2×2 coupler 222 couples two split lights and performs the interference operation.

Figure 5A:
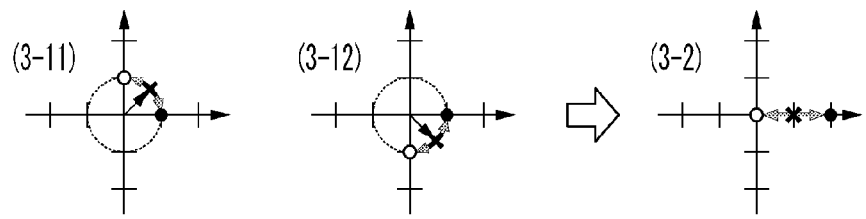
FIG. 5A is a diagram for explaining the operating principle of a 1×2 RZ pulse carver to be driven with $V\pi$.
Figure 5B:
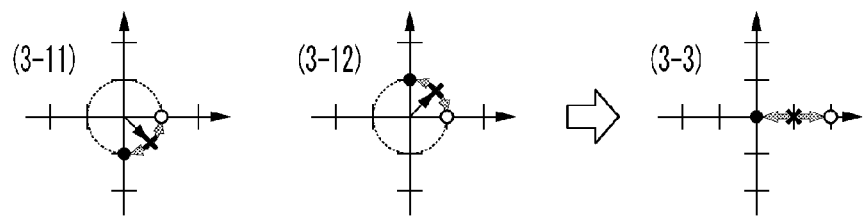
FIG. 5B is a diagram for explaining the operating principle of the 1×2 RZ pulse carver to be driven with $V\pi$.
Figure 5C:
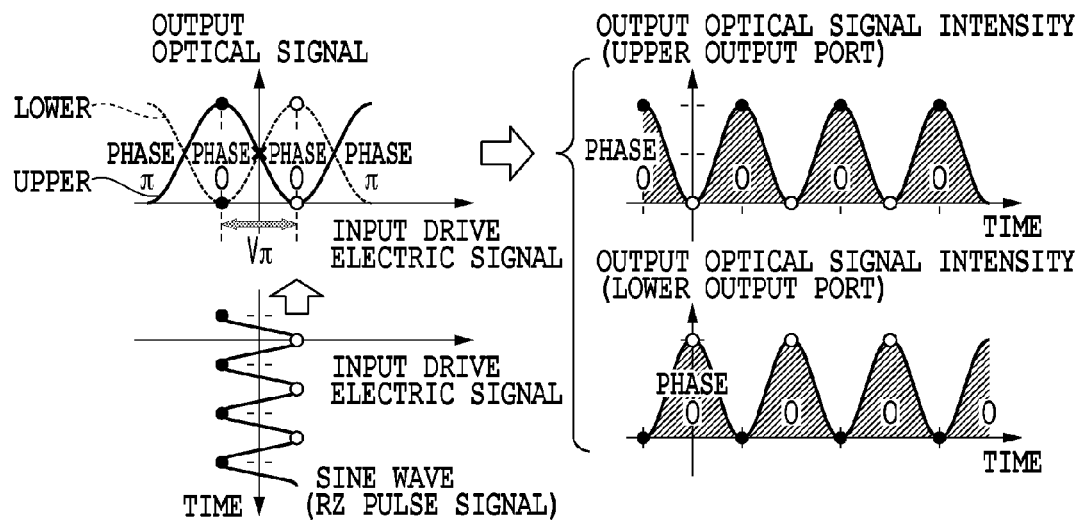
FIG. 5C is a diagram for explaining the operating principle of the 1×2 RZ pulse carver to be driven with $V\pi$.

The operating principle of the Vπ-driven 1×2 RZ pulse carver will now be described while referring to FIGS. 5A to 5C. The phase of an optical signal output in the electric field by the 1×2 RZ pulse carver changes as shown in FIGS. 5A and 5B. FIG. 5A shows changes for one of the output ports (the upper port in FIG. 4) of the 2×2 coupler 222, and FIG. 5B shows changes for the other output port (the lower port in FIG. 4) of the 2×2 coupler 222. The light that passes through the phase shifter 223 for modulation is affected by positive phase modulation, and therefore, the obtained electric field vector indicates a counterclockwise trajectory (●→x→○) (3-11). The light that passes through the phase shifter 224 for modulation is affected by negative phase modulation, and therefore, the obtained electric field vector indicates a clockwise trajectory (●→x→○)(3-12). Since a phase difference of 90° is provided for an optical signal transmitted along a cross-path with respect to an optical signal passed along a bar-path, the trajectories are drawn at a position, as illustrated, where the optical signal at the upper output port of the 2×2 optical coupler 222 is shifted 90° relative to the optical signal at the lower output port.

Since the composition of the two electric field vectors serves as the electric field vector of an output optical signal, the trajectories of the output optical signals represent linear lines along the real axis (3-2 and 3-3). Therefore, in a case wherein a signal CLK having an amplitude Vπ is used for driving, repetitive optical pulses are output through the individual output ports with the same optical phase and the same intensity waveform used for the individual symbols. As shown in FIG. 5C, the movements of the trajectories for the upper output port and the lower output port are directly opposite. Therefore, when the output at the upper output port is at maximum, the output of the lower output port is at minimum, and when the output at the upper output port is at minimum, the output at the lower output port is at maximum. The timing for outputting an optical pulse from the upper output port and the timing for outputting an optical pulse from the lower output port are shifted by a period of half a clock, i.e., a period equivalent to half a symbol of a modulation symbol rate.

Through this processing, the 1×2 RZ pulse carver 220 becomes a functional equivalent of an optical switch that is changed in accordance with an RZ pulse signal. The input light CW is output to either the upper output port or the lower output port, and it is found that, on the whole, a fundamental loss has not occurred in the 1×2 RZ pulse carver 220.

Figure 6:
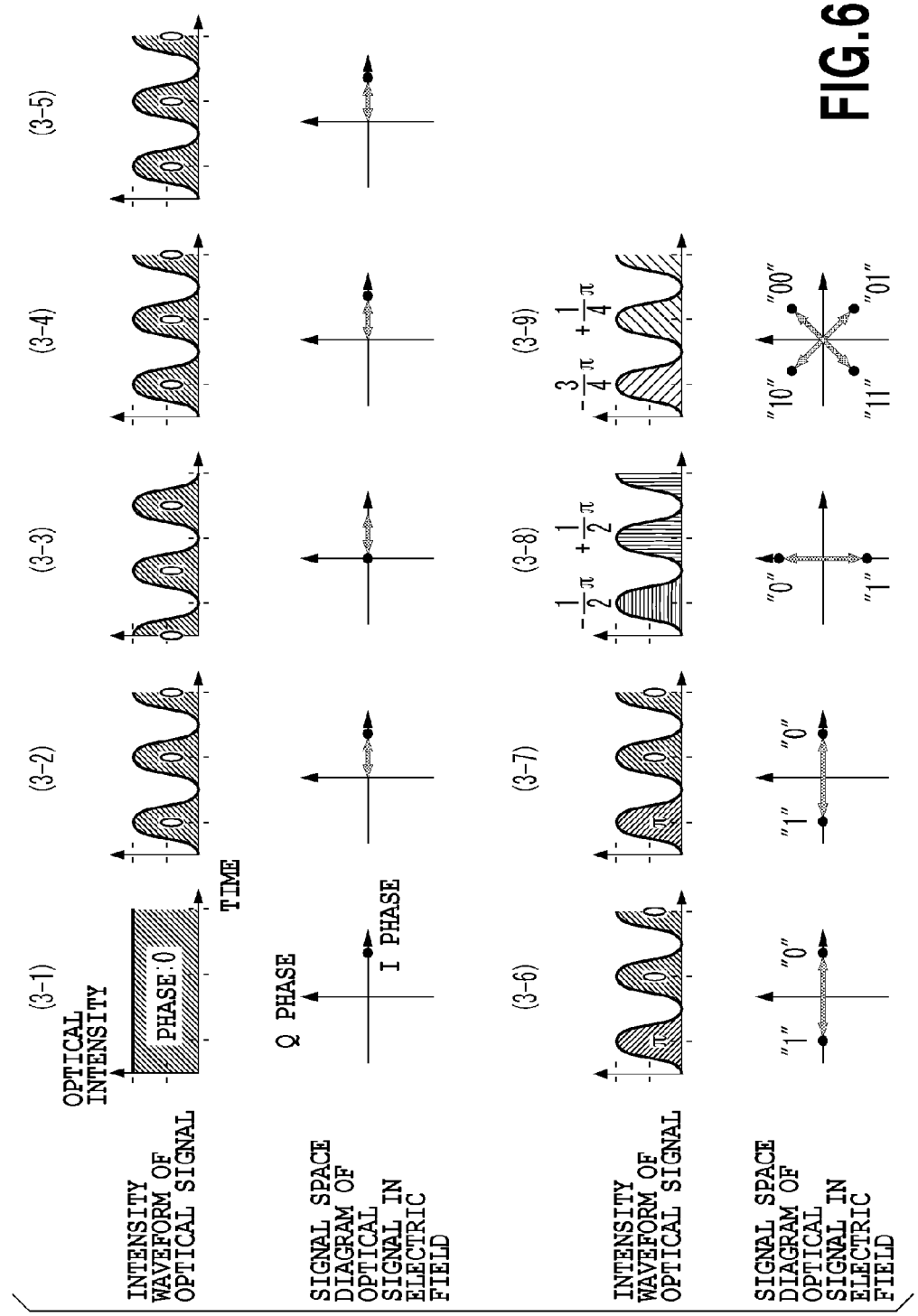
FIG. 6 is a diagram showing the intensity waveform of an optical signal for the optical modulator of the first embodiment of the present invention and the phase of the optical signal in the electric field.

FIG. 6 shows the intensity waveform of an optical signal for the optical modulator and the phase of the optical signal in the electric field according to the first embodiment. When the light CW is input to the optical modulator 200 in FIG. 4 (3-1), as described above while referring to FIG. 5, an optical pulse is output for which timing has been shifted by half a symbol of the modulation symbol rate (3-2 and 3-3). For the optical signals output by the 1×2 RZ pulse carver 220, the delay circuit 240 provides a delay corresponding to half a symbol for one of the output signals, and outputs the two signals at the same timing (3-4 and 3-5).

In the same manner as performed by the conventional DQPSK modulator, binary-phase modulation is performed by the I-channel MZI modulator 213 and the Q-channel MZI modulator 214 (3-6 and 3-7), and the obtained modulated signals are coupled with a phase difference of 90°, while a quarter wavelength is employed as an optical path difference between the I-channel side and the Q-channel side (3-8). As a result, as shown at (3-9), an output optical signal is obtained by performing quadrature phase modulation and an RZ-DQPSK optical signal for which solitary pulses are formed for the individual symbols can be obtained.

Figure 1:
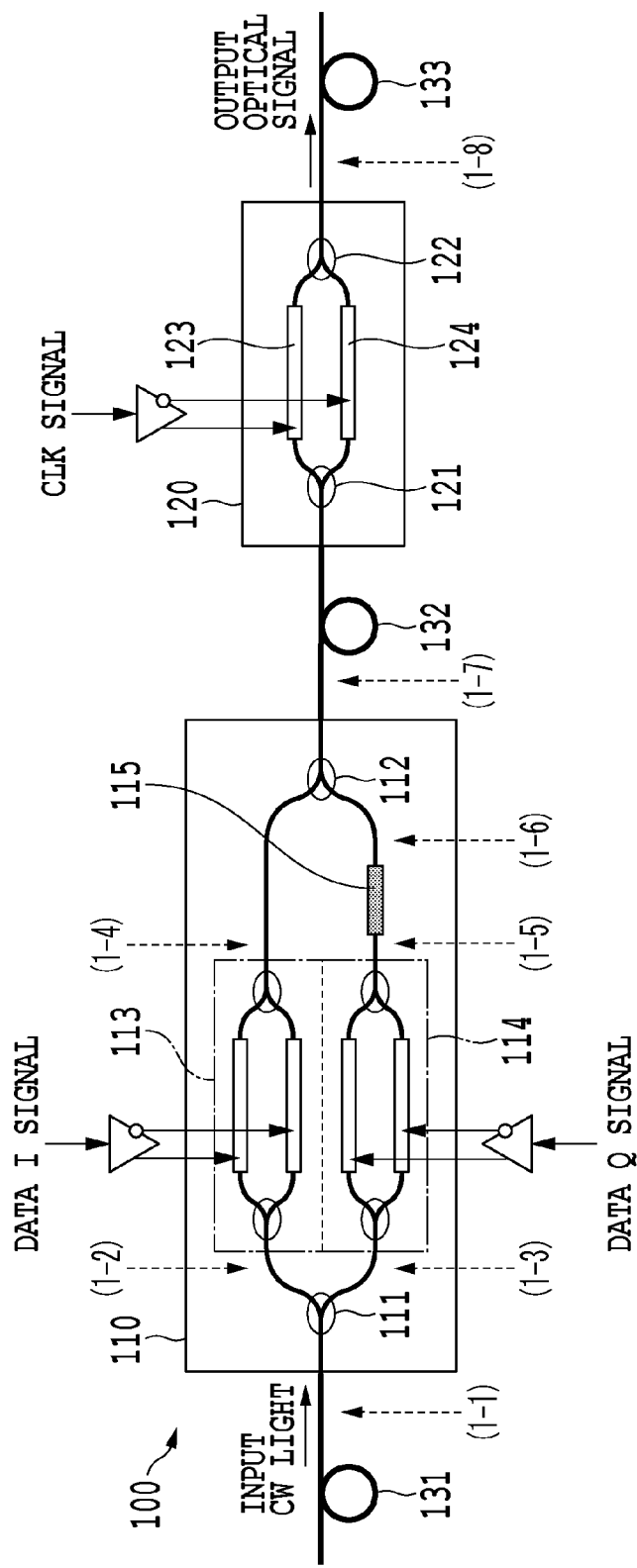
FIG. 1 is a diagram illustrating the configuration of a conventional optical modulator.
Figure 3:
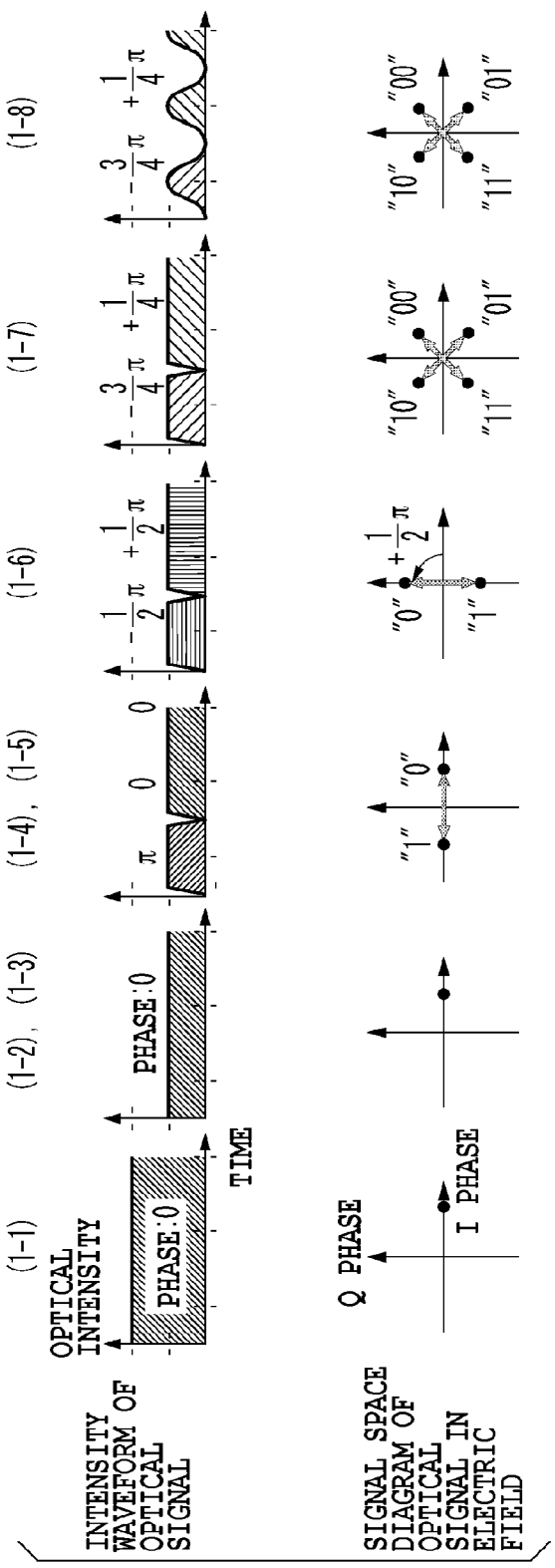
FIG. 3 is a diagram showing the intensity waveform of an optical signal for the conventional optical modulator and the phase of the optical signal in the electric field.

When the signal waveform provided by the optical modulator 200 in the first embodiment at (3-9) in FIG. 6 is compared with the signal waveform provided by the conventional optical modulator 100 at (1-8) in FIG. 3, the intensity of the optical signal for this embodiment is twice that of the conventional signal, and it is found that the attenuation of the intensity of the optical signal is low. This is because, as described above, the structure of one input and two outputs is employed for the RZ pulse carver 220 to avoid a fundamental loss that occurs due to pulse carving.

In the first embodiment, the delay circuit 220 is arranged in front of the data modulators (the I-channel modulators 213 and the Q-channel modulator 214). However, the positions of the delay circuit 220 and the data modulators may be changed, so that a timing for outputting a signal (Data Q signal) to the Q-channel modulator 214 may be earlier by half a symbol than a timing for outputting a signal (a Data I signal) to the I-channel modulator 213. Specifically, when a delay circuit that provides a delay of half a symbol is inserted into a circuit that supplies a Data I signal, the same results can be obtained.

A length equivalent to half a symbol is employed as a delay provided by the delay circuit 240. However, the optical signal output by the 1×2 RZ pulse carver 220 is an optical pulse having a repetition rate equal to the symbol rate. Therefore, the delay length need only be a length equal to 1.5 symbols, or (k+0.5) symbols (here, k is an integer), i.e., need only be a length whose fraction is equivalent to 0.5 symbol. However, basically it is preferable that the absolute value of k be a small value, because in a case wherein the absolute value of k is too great, and wherein the symbol rate is shifted relative to the design delay length, the shift of the symbol is greatly changed, and the fractional part is shifted away from the delay, which is equivalent to 0.5 symbol.

It is also preferable that the upper and lower portions of the RZ pulse signal be symmetric, so that the same shape can be provided for the isolated waveforms of the signals at the upper output port and the lower output port of the 1×2 RZ pulse carver 220. Specifically, it is preferable that a drive waveform f(t) satisfy a relationship of $$f(t-CLK/2)=-f(t),$$

with respect to the period equivalent to half a clock of the CLK signal.

Furthermore, from the viewpoint of the prevention of spectral line broadening of the output optical signal, a sine wave is more appropriate as a drive waveform than a square wave. Therefore, instead of merely employing a CLK signal, an RZ pulse signal is much more appropriate a clock signal with a sine wave having upper and lower symmetry which is obtained by performing waveform shaping via an electric bandpass filter or an electric low-pass filter.

Here, a monitoring method for a shift in the operating point of the modulator, and a shift in the orthogonally will be described. Since the RZ pulse carver is arranged together with the DQPSK modulator to provide the modulator configuration of this embodiment, some means for arranging the monitor output unit is required.

The simplest method is that a monitoring device for the RZ pulse carver 220 is located at the position (3-2) or (3-3) in FIG. 4, and a monitoring device for the DQPSK modulator is located at the position (3-9), i.e., to the rear of the 2×1 coupler 212. The RZ pulse carver 220 has two outputs. However, in a case wherein only one of the output ports is focused on, it appears that the RZ pulse carver 220 basically functions in the same way as the conventional RZ pulse carver. Therefore, when monitoring of either output port is performed, a conventional adjustment method can be employed unchanged. The DQPSK modulator differs from the conventional modulator in that an optical signal having no fundamental loss is output. As for monitoring the DQPSK modulator, when monitoring is performed at the position (3-9), the conventional adjustment method can be employed unchanged.

First Embodiment

DQPSK Modulator that Includes an RZ Pulse Carver; 2Vπ-Drive

Next, for the optical modulator 200 of the first embodiment, an explanation will be given for a case wherein a signal obtained by dividing a CLK signal by two (CLK/2) is employed as an RZ pulse signal, and an input signal has an amplitude of 2Vπ (a 2Vπ-drive operation). This method for performing RZ pulse carving using a CLK/2 signal having an amplitude of 2Vπ is called carrier-suppressed RZ pulse carving (CSRZ modulation). Generally, the spectral line of the signal following the RZ pulse carving is extended so about two times that before the RZ pulse carving, but in the CSRZ pulse carving case, the resultant spectral line can be extended only about 1.5 times. Therefore, CSRZ pulse carving is employed frequently, in order to increase frequency efficiency.

Figure 7A:
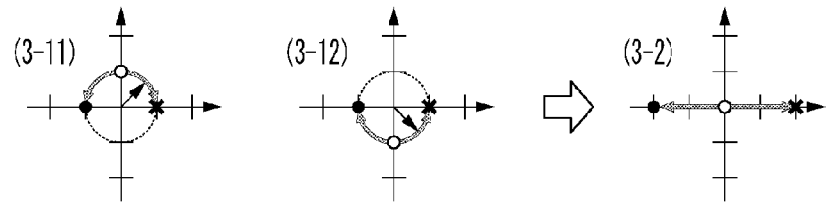
FIG. 7A is a diagram for explaining the operating principle of a 1×2 RZ pulse carver to be driven with $2V\pi$.
Figure 7B:
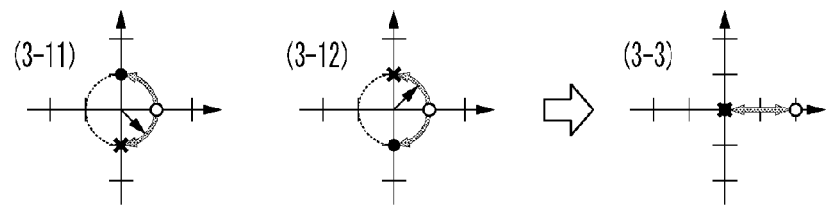
FIG. 7B is a diagram for explaining the operating principle of the 1×2 RZ pulse carver to be driven with $2V\pi$.

The operating principle of the 1×2 RZ pulse carver with a 2Vπ drive will be described while referring to FIGS. 7A to 7C. When a 2Vπ drive is to be performed, the phase of an optical signal output in the electric field by the 1×2 RZ pulse carver 220 in FIG. 4 is changed as shown in FIGS. 7A and 7B. FIG. 7A depicts one of the output ports (the upper port in FIG. 4) of the 2×2 coupler 222, and FIG. 7B depicts the other output port (the lower port in FIG. 4) of the 2×2 coupler 222. Since the 1×2 RZ pulse carver 220 has the same structure, the movement of the electric field vector associated by the drive operation is the same as that by a Vπr drive. Furthermore, the optical signal at the upper output port is shifted 90° in phase from the optical signal at the lower output port, which is the same as when the Vπ drive was performed. The trajectories of the optical signals represent linear lines along the real axis, and this is also the same as in the previous case. However, since the drive range of the drive pulse is doubled, and the pulse period is also doubled, the appearances of the output waveforms (3-2 and 3-3) differ slightly from those at the Vπ drive.

Figure 7C:
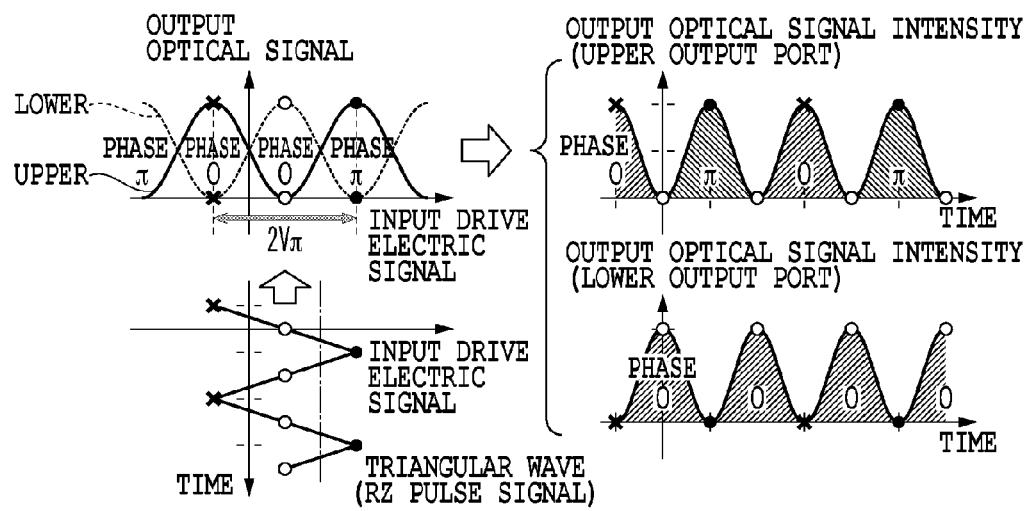
FIG. 7C is a diagram for explaining the operating principle of the 1×2 RZ pulse carver to be driven with $2V\pi$.

Specifically, as shown in FIG. 7C, the center of the amplitude of a drive signal is +Vπ/2, the trajectory of the optical signal of the upper output port of the 1×2 RZ pulse carver 220 shows movement in a direction away from the positive toward the negative side along the real axis. Therefore, when driving by the CLK/2 signal is performed for one period, two solitary pulses are output for which the optical phases have been shifted by the amplitude π. When the intensity-modulated waveforms are focused on, these are unchanged from those for the Vπ driving in FIG. 5 (one solitary pulse is output by driving the CLK signal for one period). However, when the optical phases are examined, for the 2Vπ driving, phase reversal has occurred for each symbol, which differs greatly from the state during the Vπ driving.

Further, since the trajectory of the optical signal at the lower output port is for a movement occurring only within the positive range along the real axis and indicates reciprocation for the CLK/2 signal during one period, the optical signals of the same phase are output with all the symbols in the same manner as during the Vπ driving. Similarly to the Vπ driving case, the timing for outputting the optical pulse at the upper output port and the timing for outputting the optical pulse at the lower output port are shifted half a symbol.

Therefore, in the 2Vπ driving case, for each symbol a phase-reversed pulse is input to the I-channel modulator 213 of the DQPSK modulator, and for modulation, a pre-coding process for inverting a bit should be performed for the DataI signal that is used to drive the phase shifters.

Further, when a CLK/2 signal for a sine wave is employed as an RZ pulse signal, the optical pulse waveform output at the upper output port and the optical pulse waveform output at the lower output port have different shapes from each other. When this case is considered by referring to FIG. 7C, the drive waveform is found to be a waveform that changes from point ● to point x in a moment. Therefore, the optical pulse waveform output at the upper output port is a waveform having a large duty ratio, i.e., a waveform for which the pulse width is wide and the optical intensity becomes 0 only at point ●. The optical pulse waveform output at the lower output port is a waveform having a small duty ratio, i.e., a waveform for which the pulse width is small and the optical intensity becomes almost zero at a time other than when at point. When the detailed calculation is performed, the duty ratio is about 67% for the optical pulse output at the upper output port, and about 33% for the optical pulse at the lower output port. As a result, a satisfactory operation cannot be obtained by only using the recommended condition employed for Vπ driving (the drive waveform having upper and lower symmetry).

While taking into account the relationship between the electric drive signal and the output optical signal in FIG. 7C, in order to provide the same waveform for the optical pulses of the signals at the upper output port and the lower output port of the 1×2 RZ pulse carver 220, it is apparent that a preferable drive waveform f(t) is such that when $$F(t)=\text{Abs}\{f(t)-V\pi/2\}-V\pi/2,$$

$$F(t-\text{CLK}/2)=-F(t)$$

is established. Further, from the viewpoint of the prevention of spectra broadening, in order to obtain the sine wave for the optical pulse, a preferable drive waveform is a triangular wave having a center of +Vπ/2. It should be noted that the individual waveforms are shown in FIG. 7, assuming that such a triangular wave is employed as a drive signal.

Figure 8:
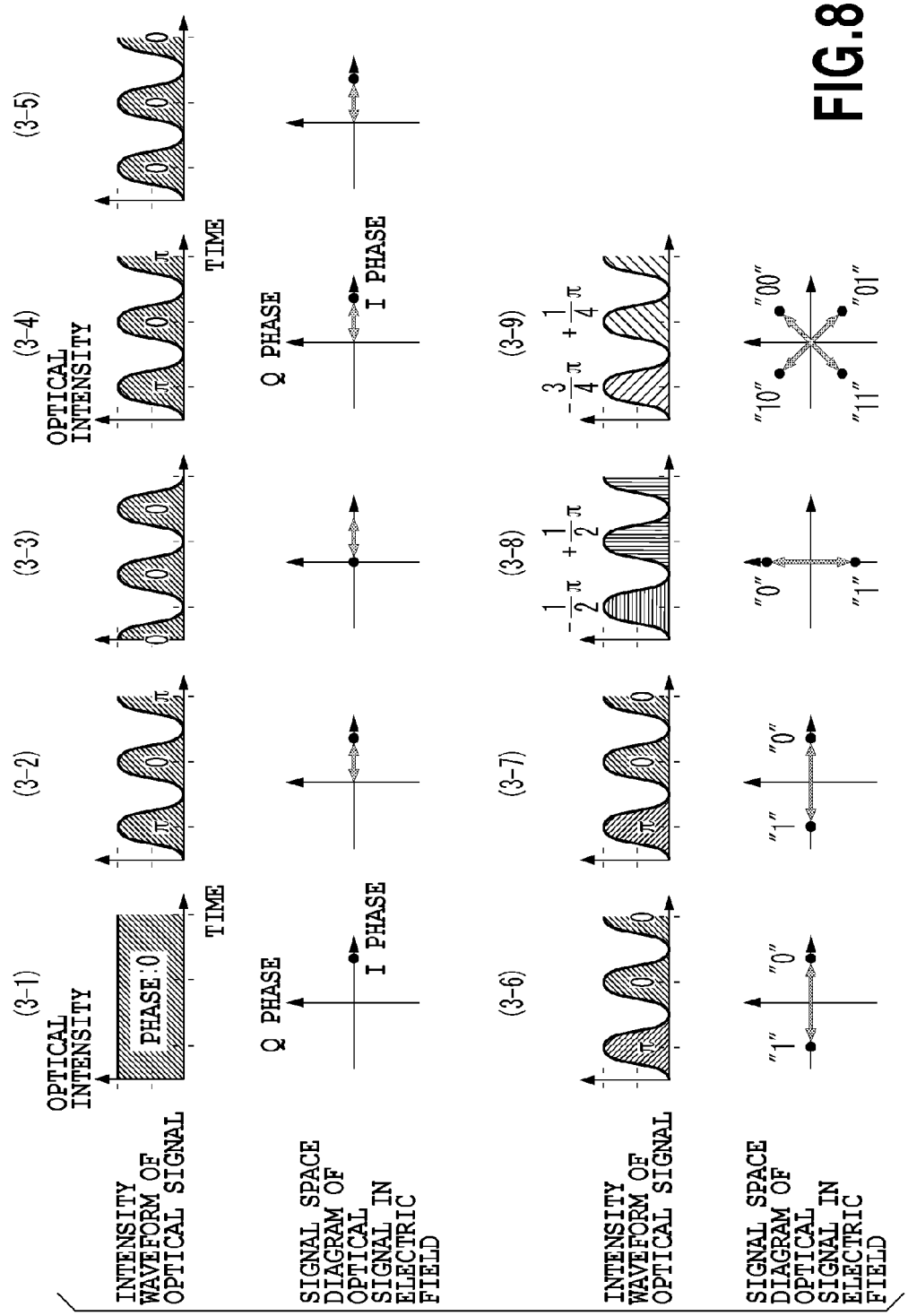
FIG. 8 is a diagram showing the intensity waveform of an optical signal for an optical modulator to be driven with $2V\pi$ and the phase of the optical signal in the electric field.

FIG. 8 shows the intensity waveform of the optical signal for the optical modulator driven with 2Vπ and the phase of the optical signal in the electric field. As described above, for each symbol, the phase reversed pulse is input to the I-channel modulator 213 of the DQPSK modulator. Therefore, a difference from the Vπ driving operation is that a pre-coding process for performing bit inversion for each symbol is additionally performed for the DataI signal used to drive the phase shifters for modulation.

The optical signals output by the 1×2 RZ pulse carver 220 (3-2 and 3-3) have waveforms for which the timings for the optical pulses are aligned by the delay circuit 240 (3-4 and 3-5). The drive signal DataI of the I-channel MZI modulator 213 is input with the bit being inverted for each symbol through the pre-coding process. Therefore, in a case wherein the original data pattern is "1 0 0 . . . ", the DataI signal is input as "0 0 1". Thus, the optical signal having a phase "π 0 π . . . " (3-4), which is received by the I-channel MZI modulator 213, is output as a signal having a phase "π 0 0 . . . " (3-6). The Q-channel MZI modulator 214 modulates the DataQ signal, without performing the per-coding process (3-7). Thereafter, the two modulated signals are coupled with a phase difference of 90° (3-8), while an optical path length between the I-channel side and the Q-channel side is employed as a quarter wavelength. As a result, an RZ-DQPSK optical signal for which the modulated into a quadrature phase as shown in (3-9) and for which solitary pulses are formed for the individual symbols, can be obtained as an output optical signal.

According to the 2Vπ driving method, when the signal waveform at (3-9) in FIG. 8 which is provided by the optical modulator 100 of the first embodiment, is compared with the signal waveform at (1-8) in FIG. 3 provided by the conventional optical modulator 100, the intensity of the optical signal in this embodiment is twice that of the conventional intensity and furthermore, it is apparent that there is little attenuation of the optical signal. This is because, as described above, the structure with one input and two outputs is employed for the RZ pulse carver 220 to avoid a fundamental loss that occurs due to pulse carving.

In a case wherein the amplitude center of a drive signal is −Vπ/2, as is apparent from FIG. 7C, the waveform output at the upper port of the 1×2 RZ pulse carver 220 is exchanged with the waveform output at the lower port, and for all of the symbols, optical signals having the same phase are output at the upper port, while at the lower port, optical signals are output for which the phase is reversed for each symbol. Therefore, in FIG. 4, the pre-coding process for performing bit inversion for each symbol is performed for the DataQ signal of the Q-channel modulator 214.

Second Embodiment

Polarization-Multiplexed QPSK Modulator that Includes an RZ Pulse Carver

Figure 9:
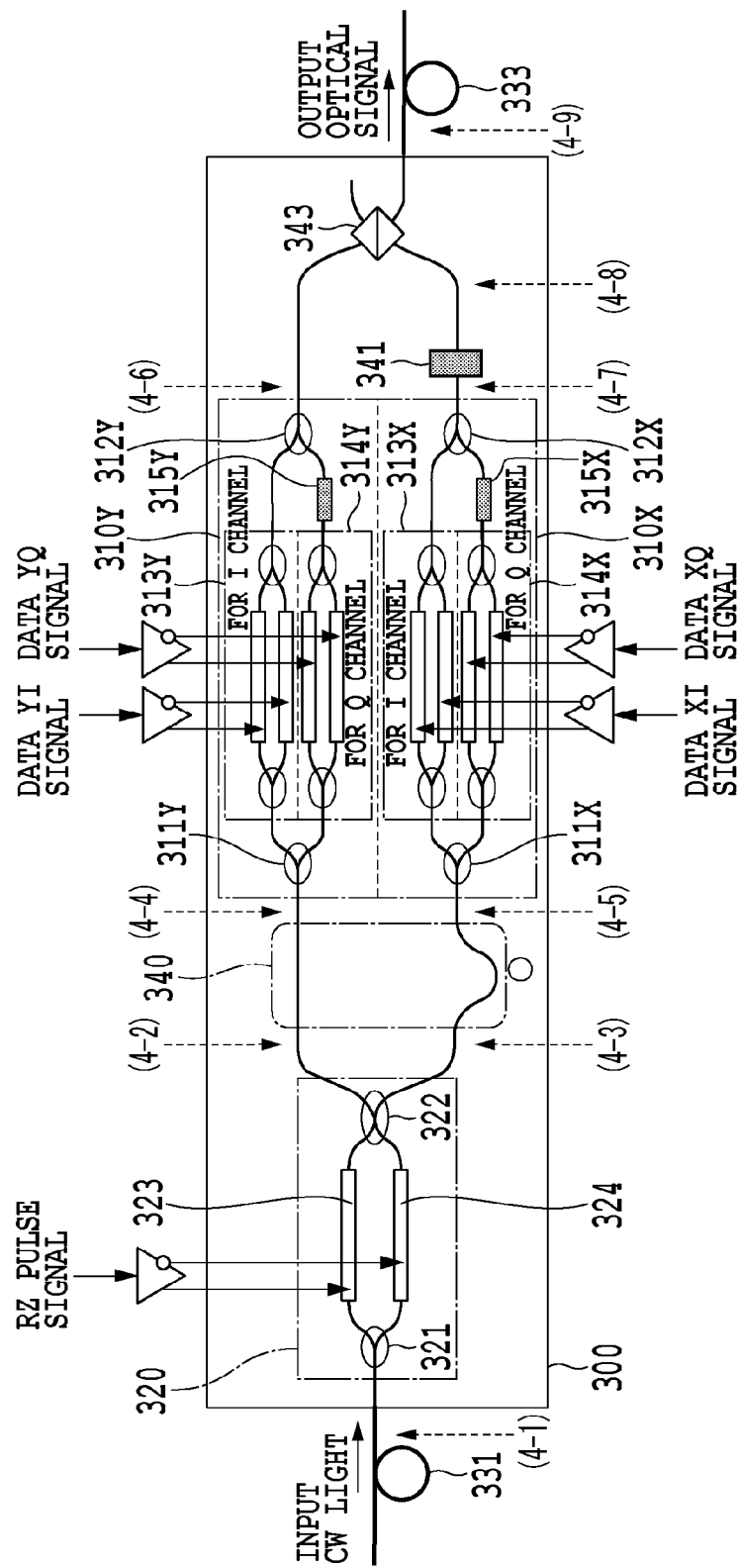
FIG. 9 is a diagram illustrating the configuration of a polarization-multiplexed QPSK modulator that includes an RZ pulse carver according to a second embodiment of the present invention.

FIG. 9 shows the configuration of a polarization-multiplexed QPSK modulator that includes an RZ pulse carver according to a second embodiment of the present invention. An optical modulator 300 includes: a 1×2 RZ pulse carver 320 having the same structure as the optical modulator 200 of the first embodiment and a delay circuit 340, both of which are arranged at the front stage; and a polarization-multiplexed QPSK modulator that is arranged at the rear stage.

The polarization-multiplexed QPSK modulator includes: an X-polarization QPSK modulator 310X; a Y-polarization QPSK modulator 310Y; a polarization rotator 341 which is connected to the output port of the X-polarization QPSK modulator 310X to convert TM polarized light into TE polarized light; and a polarization beam combiner 343 which combines light output by the X-polarization QPSK modulator 310X and light output by the polarization rotator 341. Here, X-polarization and Y-polarization define the polarization direction of the output of the polarization beam combiner.

The X-polarization QPSK modulator 310X and the Y-polarization QPSK modulator 310Y include, respectively: I-channel modulators 313X and Y and Q-channel modulators 314X and Y that are data modulators wherein phase shifters used for modulation are arranged along two arm waveguides held between 1×2 couplers 311X and Y and 2×1 couplers 312X and Y; and 2×1 couplers 312X and Y each of which combines the outputs of the two data modulators. Along at least one of each two arm waveguides, a π/2 phase shifter 315X or Y is inserted to provide a phase difference of 90° for the signal output by the Q-channel modulator 314X or Y, with respect to the signal output by the I-channel modulator 313X or Y.

Figure 10:
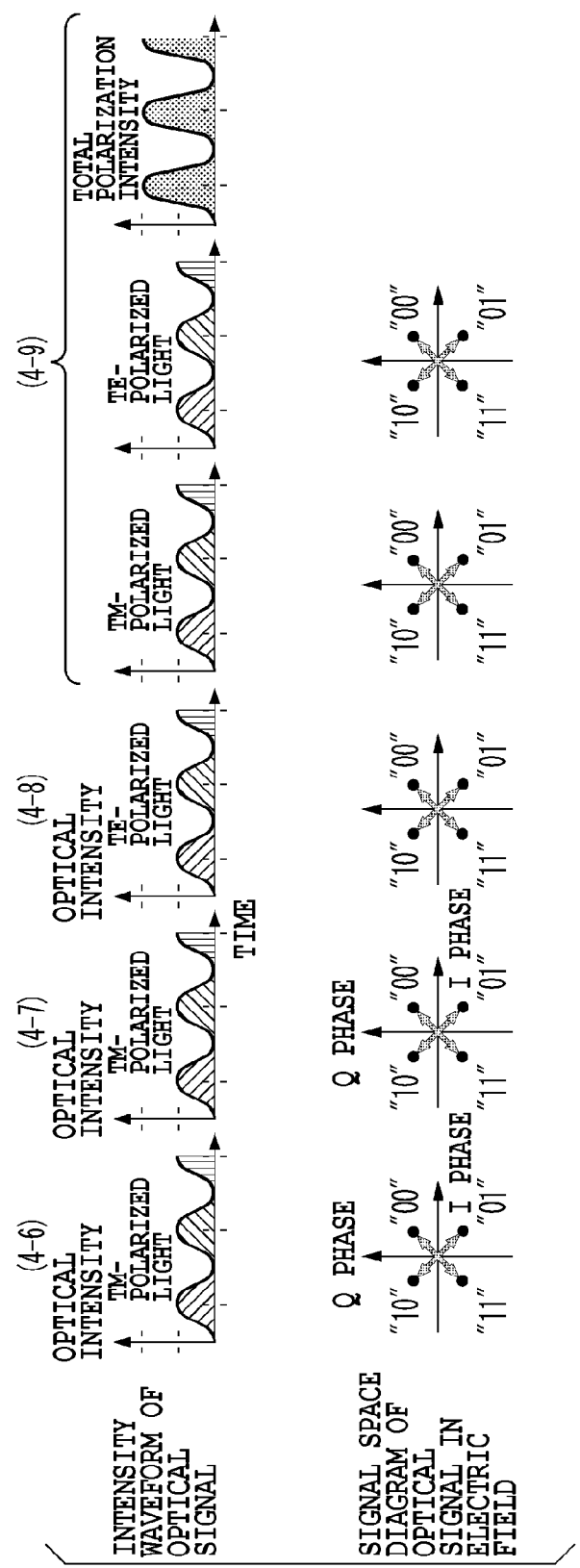
FIG. 10 is a diagram showing the intensity waveform of an optical signal for the optical modulator of the second embodiment of the present invention, and the phase of the optical signal in the electric field.

FIG. 10 shows the intensity waveform of the optical signal for the optical modulator of the second embodiment and the phase of the optical signal in the electric field. Assume that a Z-cut substrate is employed for the optical modulator 300 and the 1×2 RZ pulse carver 320 is operated by the Vπ driving method described above. The waveforms obtained beginning at the input (4-1) by the optical modulator 300 in FIG. 9 until the output (4-4 and 4-5) by the delay circuit 340 are the same as those in (3-1) to (3-5) in FIG. 6 for the first embodiment. As the output of the delay circuit 340, pulses with a repetition rate equivalent to the symbol rate are output at the same timing.

In synchronization with the repetitive pulses, the X-polarization QPSK modulators 310X and Y and the Y-polarization QPSK modulator 310Y perform QPSK modulation, and output QPSK optical signals having quadrature phases (4-6 and 4-7). Since modulation using TM polarization is performed for the Z-cut substrate, the TM polarized light is propagated in this case. The optical signal output by the X-polarization QPSK modulator 310X is also TM polarized light, which is then converted into TE polarized light (4-8). Thereafter, the polarization beam combiner 343 performs polarization multiplexing for the TM polarized light output by the Y-polarization QPSK modulator 310Y (4-7) and the TE polarized light output by the polarization rotator 341 (4-8), and obtains a polarization-multiplexed signal (4-9). Since at the same pulse timing, polarization multiplexing is performed for the individual polarization signals, the obtained polarization-multiplexed signal is especially called a bit aligned polarization-multiplexed signal.

In the second embodiment, since the structure with one input and two outputs is also employed for the RZ pulse carver 320, the fundamental loss caused by pulse carving can be avoided, and as for the polarization multiplexed signal obtained by performing X-polarization (TE polarization) and Y-polarization (TM polarization) modulation, it is found that the mean value of the total optical signal intensities is the same as that of the first embodiment.

A simple optical coupler may be employed as the polarization beam combiner 343. In this case, the occurrence of a fundamental loss of 3 dB is a demerit. Further, in a case wherein an optical coupler is employed, and when the performance of the polarization rotator 341 is inappropriate, the polarized state is output unchanged, so that a problem occurs that the orthogonality of the X-polarization signal and the Y-polarization signal is shifted from 90° to cause a deterioration of signals. In a case wherein the polarization beam combiner 343 is employed, the polarization beam combiner performs polarization extinction to attenuate the polarization component that remains without being converted. Therefore, even when the performance of the polarization rotator is unsatisfactory, the accurate orthogonality of the polarization components can be maintained. Therefore, it is desirable that a polarization beam combiner be employed than a simple optical coupler.

Further, in a case wherein the 1×2 RZ pulse carver 320 is driven with 2Vπ, the difference for the first embodiment is also applied for the second embodiment. A triangular wave having the amplitude center of +Vπ/2 shown in FIG. 7C is input as a waveform for driving the RZ pulse carver 320, and the pre-coding process for performing bit inversion for each symbol is additionally provided for both of a Data YI signal and a Data YQ signal of the Y-polarization QPSK modulator 310Y. In a case wherein the amplitude center of a triangular-wave signal for driving the RZ pulse carver 320 is −Vπ/2, the pre-coding process is provided for both of a Data XI signal and a Data XQ signal of the X-polarization QPSK modulator 310X.

Since a Z-cut substrate is employed for the second embodiment, the polarization rotator 341 is arranged on the same side as the X-polarization QPSK modulator 310X. However, in a case wherein an X-cut substrate is employed, the modulation operation is to be performed in the direction of the TE polarization, and therefore, the polarization rotator 341 is arranged on the same side as the Y-polarization QPSK modulator 310Y.

For the second embodiment, a method for monitoring a shift of the operating point and a shift in the orthogonality will also be described. Generally, in a case wherein the polarization-multiplexed QPSK modulator is employed, a monitoring device is provided for a QPSK modulator for each polarization. Therefore, a total of three monitoring devices including a monitoring device for an RZ pulse carver are required.

When the method employed for the first embodiment is applied for the modulator configuration of the second embodiment, i.e., when a monitoring device for the RZ pulse carver 320 is arranged at the location (4-2) or (4-3) in FIG. 9, a monitoring device for the Y-polarization QPSK modulator 310Y is arranged at the location (4-6), and a monitoring device for the X-polarization QPSK modulator 310X is arranged at the location (4-7) or (4-8), the adjustment method as used for the conventional case can also be employed.

Furthermore, according to the modulator configuration of the second embodiment, the number of monitoring locations can be reduced by employing the following method. In a case wherein the operating point of an RZ pulsed signal transmitted to the 1×2 pulse carver, i.e., a drive voltage at the bias point is shifted as shown in FIG. 17A, the intensity of light output by the 1×2 RZ pulse carver changes as shown in FIG. 17B. When a shift of the optimum bias point occurs, the pulse shapes of light output at the individual output ports are distorted. As for the temporal mean intensity of the output light, it is obvious from FIG. 17C that the temporal mean value at the upper output port and the temporal mean value at the lower output port are equal at the optimum bias point.

Therefore, the bias point of the 1×2 RZ pulse carver should be adjusted to equal the temporal mean values of the optical intensities at the locations (4-2) and (4-3). The temporal mean values of the optical intensities at the locations (4-2) and (4-3) are basically equal to those at the locations (4-6) and (4-7) or (4-8). Therefore, only at the monitoring location (4-6) for the Y-polarization QPSK modulator and the monitoring location (4-7) or (4-8) for the X-polarization QPSK modulator, the adjustment of the bias point of the 1×2 RZ pulse carver need be performed to equal the temporal mean values of the optical intensity. Therefore, the monitoring location for the RZ pulse carver at the location (4-2) or (4-3) previously described can be eliminated.

Further, as apparent from FIG. 17B, the values of a change in the optical outputs for (4-2) and (4-3) become greatest in a case wherein the bias value is slightly altered. As another monitoring method, a very small dither signal is superimposed with the bias value of the 1×2 RZ pulse carver, and lock-in detection for the change of light output at (4-2) or (4-3) is performed by using the dither signal. When detection results are employed to calculate the bias point where the amount of optical output change is maximum, the optimum bias value can be obtained. The changes of the optical outputs at (4-2) and (4-3) are basically the same as those at (4-6) and (4-7) or (4-8).

Therefore, when lock-in detection is performed at the monitoring location (4-6) for the Y-polarization QPSK modulator and the monitoring location (4-7) or (4-8) for the X-polarization QPSK modulator, the bias point of the 1×2 RZ pulse carver can be adjusted. The above described monitoring location (4-2) or (4-3) dedicated for the RZ pulse carver can be eliminated.

The monitoring method described here can also be applied for the first embodiment. Specifically, a monitoring device is provided at the locations (3-2) or (3-4), and (3-3) or (3-5) to perform adjustment of the bias point of the 1×2 RZ pulse carver, so that the temporal mean is equaled.

Third Embodiment

Figure 11:
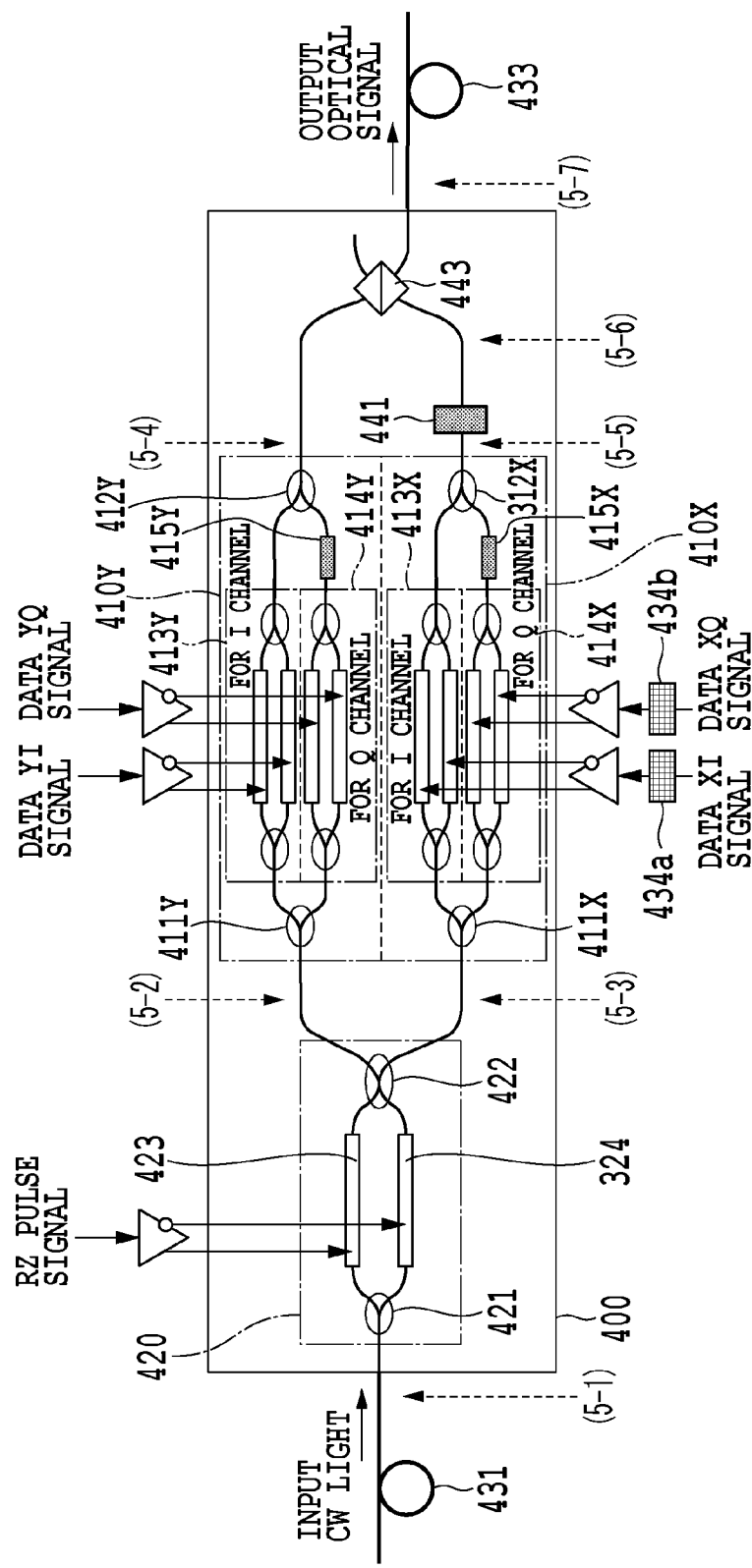
FIG. 11 is a diagram illustrating the configuration of a DQPSK modulator that includes an RZ pulse carver according to a third embodiment of the present invention.

Bit-Interleaved, Polarization-Multiplexed QPSK Modulator that Includes an RZ Pulse Carver FIG. 11 shows the configuration of a polarization-multiplexed QPSK modulator that includes an RZ pulse carver according to a third embodiment of the present invention. A difference from the second embodiment in FIG. 9 is that a delay circuit is not included, and electric delay circuits 434a and 434b are additionally arranged to insert a delay period equivalent to half a symbol into drive signals (a DataXI signal and a DataXQ signal) for one of QPSK modulators (in FIG. 11, an X-polarization QPSK modulator 410X).

Figure 12:
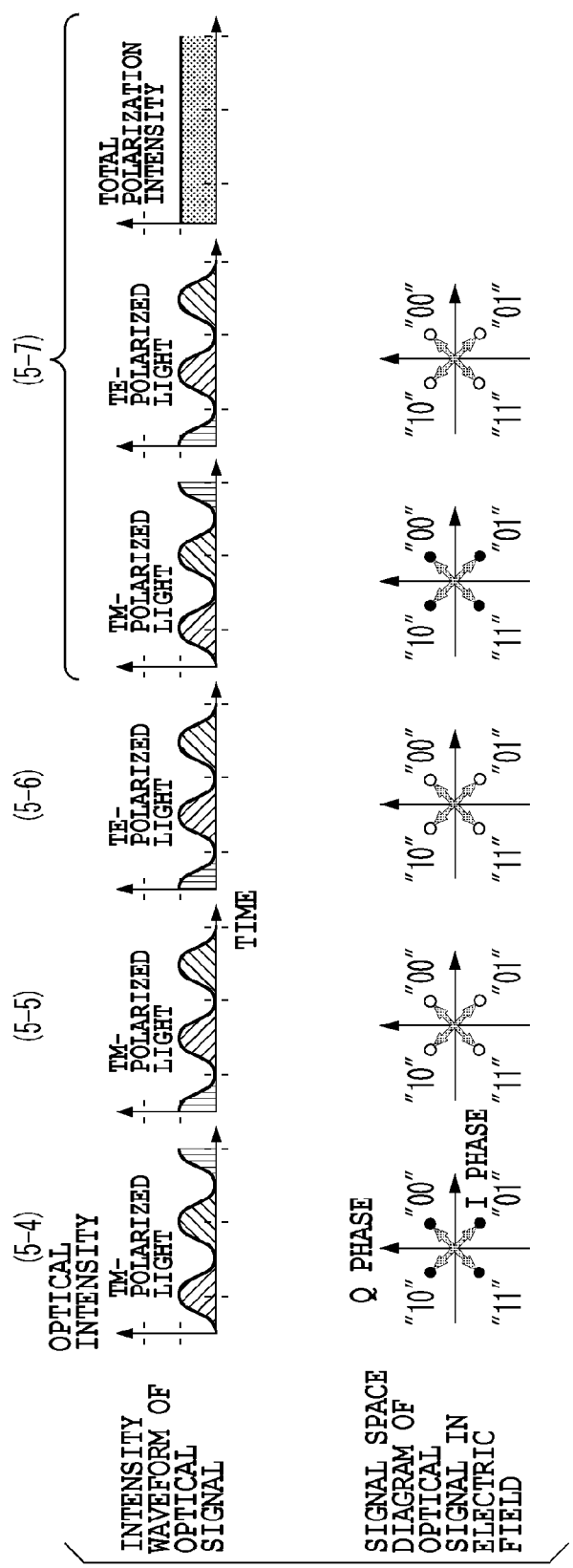
FIG. 12 is a diagram showing the intensity waveform of an optical signal for the optical modulator of the third embodiment of the present invention, and the phase of the optical signal in the electric field.

FIG. 12 shows the intensity waveform of an optical signal for an optical modulator for the third embodiment and the phase of the optical signal in the electric field. Waveforms beginning at input (5-1) to an optical modulator 400 until output (5-2 or 5-3) of a 1×2 RZ pulse carver 420 are the same as those for (3-1) to (3-3) in FIG. 6 for the first embodiment. The signals are output by a Y-polarization QPSK modulator 410Y at (5-4) and by the X-polarization QPSK modulator 410X at (5-5) with a shift of half a symbol. Therefore, the individual polarized beams are polarization multiplexed with the pulse timings with a shift of half a symbol (5-7). At this point, the optical signals in this embodiment are greatly different from the optical signals obtained in the second embodiment. Such polarization-multiplexed signals are especially called bit-interleaved polarization-multiplexed signals.

In multiplexing with polarization bit-interleaving, the intensity of the Y-polarized pulse is zero at the X-polarized pulse peak, while the intensity of the X-polarized pulse is zero at the Y-polarized pulse peak. Therefore, even when polarization splitting is inefficient at the time of reception, the occurrence of crosstalk can be suppressed at the pulse position, because there are no pulses of the opposite polarization. As another advantage, so long as a symbol rate used for reception is twice of the original symbol rate, polarization splitting is not required to receive the bit-interleaved polarization-multiplexed signal.

In the third embodiment, since the structure with one input and two outputs is also employed for the RZ pulse carver 420, a fundamental loss caused by pulse carving can be avoided. As for the polarization-multiplexed signal obtained by performing X-polarization (TE polarization) and Y-polarization (TM polarization) multiplexing, it is found that the mean value of the total optical signal intensities is the same as that in the first embodiment.

The electric delay circuits 434a and 434b in FIG. 11, for inserting a delay period of half a symbol, are provided merely as a comparison with those in the second embodiment shown in FIG. 9. With this structure, the timings for the individual Data signals can be adjusted in consonance with the optical pulse train generated by the 1×2 RZ pulse carver, and be employed to drive the corresponding QPSK modulators.

It is obvious that the monitoring method described in the second embodiment for a shift of the operating point and a shift in orthogonality can be applied in the same manner.

Example 1

DQPSK Modulator that Includes an RZ Pulse Carver

Figure 13:
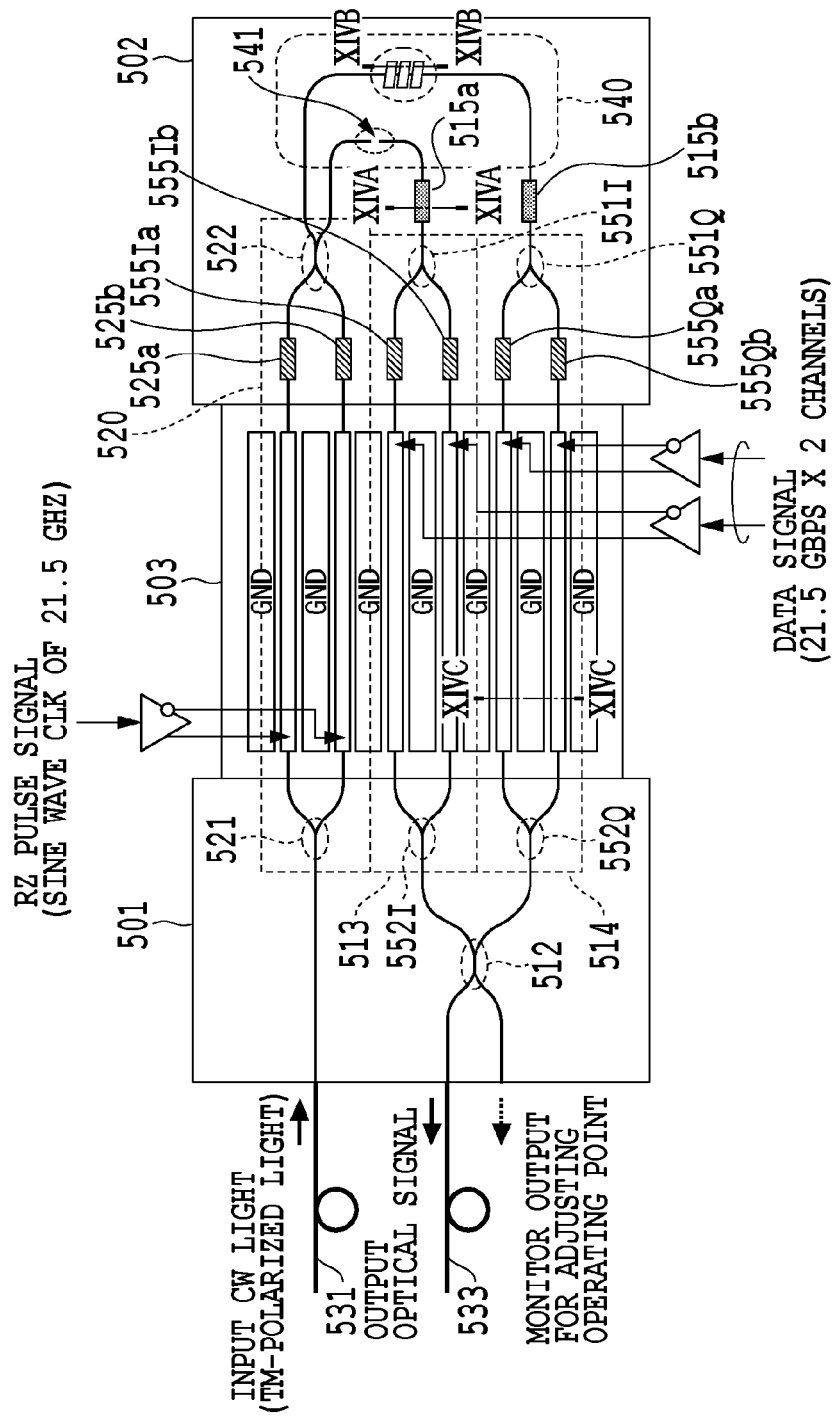
FIG. 13 is a diagram illustrating the configuration of a DQPSK modulator that includes an RZ pulse carver according to a first example.

FIG. 13 shows the configuration of a DQPSK modulator including an RZ pulse carver according to example 1. An optical modulator for example 1 employs a hybrid integrated structure, wherein the end faces of silica-based planar lightwave circuit (PLC) substrates 501 and 502 are connected to the end face of and an LN substrate 503, where an LN modulator array is formed.

Since the EO effects of the PLC waveguide is very small, a modulator can not be formed using only PLC waveguides. However, the propagation loss of the PLC waveguide is equal to or less than one tenth of the propagation loss of the LN waveguide, and the PLC waveguide is a waveguide medium with very low loss. In addition, the allowable bending radius of a curved waveguide is about 2 mm, and a high degree of freedom for design is provided, so that a variety of optical passive circuits with low loss can be provided by using a PLC waveguide. As for the LN waveguide, since the propagation loss and the allowable bending radius are greater than those of the PLC waveguide, the LN waveguide is not appropriate to form a complicated optical circuit. However, since high EO effects are provided as described above, the LN waveguide is very superior for a high-speed modulation circuit.

Therefore, in a case of a complicated modulator described in these embodiments, the integrated structure is provided by employing a PLC waveguide for passive circuits, such as a splitting/coupling circuit, and employing an LN waveguide only for the modulator array, so that the advantages of both the PLC waveguide and the LN waveguide can be employed.

Moreover, a modulator with lower loss and more superior characteristics can be produced, compared with when the LN waveguide monolithic technology is employed. This advantage is more noticeable for a modulator having a more complicated configuration, and is greater, as will be described for example 2 later, for a polarization-multiplexed QPSK modulator that requires a polarization beam combiner, in addition to a splitting/coupling circuit.

A 1×2 coupler 521 of a 1×2 RZ pulse carver 520, 2×1 output-side couplers 5521 and Q of an I-channel modulator 513 and a Q-channel modulator 514 of a DQPSK modulator, and a 2×2 coupler 512 for coupling the output of the I-channel modulator 513 and the output of the Q-channel modulator 514 are fabricated on the PLC substrate 501, to which an input/output fibers 531 and 533 are connected. One of the outputs of the 2×2 coupler 512 is employed as an optical signal output, and the other output is employed as monitor output in order to adjust the operating point of the modulator. It should be noted that a wavelength-independent coupler (WINC) is employed for the 2×2 coupler. Further, the angle of a polarization-maintaining input fiber is adjusted, so that an optical signal into to the PLC substrate 501 is TM polarized light.

A 2×2 coupler 522 of a 1×2 RZ pulse carver 520, 1×2 input-side couplers 5511 and Q of the I-channel modulator 513 and the Q-channel modulator 514 of the DQPSK modulator, and a delay circuit 540 for inserting a delay period corresponding to half a symbol rate, are fabricated on the PLC substrate 502. Since the refractive index of the waveguide of the delay circuit 540 is about 1.48, the waveguide length difference is set about 4.7 mm in consonance with the bit rate of 43 Gbps, i.e., the symbol rate of 21.5 Gbaud.

Along the two arm waveguides of the individual modulators, thermo-optic phase shifters 525a and 525b, 555Ia and 555Ib, and 555Qa and 555Qb are provided in order to adjust the operating points of the I-channel modulator 513 and the Q-channel modulator 514. The thermo-optic phase shifters 515a and 515b are located at the output port of the delay circuit 540, and serve as $\pi/2$ phase shifters that adjust the I-channel and Q-channel optical signals of the DQPSK modulator with a phase difference of 90°, and thereafter, combines these signals. Referring to FIG. 4 for the first embodiment, the $\pi/2$ phase shifters are provided for the output ports of the I-channel modulator 513 and the Q-channel modulator 514. Since the amount of delay corresponding to the optical phase difference of $\pi/2$ is very little, i.e., a quarter wavelength of light, the $\pi/2$ phase shifters may be arranged at the front of the I-channel modulator 513 and the Q-channel modulator 514, as in Example 1.

The thermo-optic phase shifters 525, 555I, 555Q and 515 are located along the two waveguides. This is because, by heating control, the thermo-optic phase shifter is operated only in a direction in which the phase is to be delayed, and in order to perform the adjustment in both the positive and negative directions, the phase shifters are provided on either arm waveguide as the adjustment devices. The thermo-optic waveguide may be provided only for one arm waveguide, and in this case, phase adjustment is performed with a range of 0 to $2\pi$, instead of a range from $-\pi$ to $\pi$, and the average power consumption required for heating control is increased.

FIG. 14A shows the cross section of the thermo-optic phase shifter 515. The thermo-optic phase shifter includes a thin-film heater 604 formed on a waveguide clad material 602 on a silicone substrate 601. The temperature of a waveguide core is locally controlled, and the refractive index of the optical waveguide immediately below the thin-film heater 604 is changed using the thermo-optic effects to control the phase of guided light wave.

In example 1, all thermo-optic phase shifters are provided on one of the PLC substrate (i.e., the PLC substrate 502) so that there is an advantage that the design for heat dissipation is required only for one PLC substrate. The thermo-optic phase shifters are provided on the PLC substrate 502 to which optic fibers are not connected, because a change of the stress imposed on the optic fiber, which occurs when a chip is expanded or shrunk due to thermal expansion, is to be avoided.

FIG. 14B shows the cross section of the delay circuit 540. For the delay circuit 540, multiple grooves 605 are formed in one part of an optical waveguide across the core waveguide 602, and a silicone resin 606 is filled in the grooves 605. With this structure, it is possible to avoid the occurrence of a phenomenon that the optical path difference of the delay circuit 540 is changed by temperature dependence of the refractive index of the optical waveguide, and the phase difference of light output by the delay circuit 540 is greatly changed by the temperature. Since temperature dependence $dn/dT$ of the refractive index of a silica-based waveguide is $1 \times 10^{-5}$, a phase change $\Delta \phi$ is obtained by the following calculation under the conditions of the above described delay length $\Delta L = 4.7$ mm and the temperature change $\Delta T = 30°$ C., $$\Delta \phi = 2\pi \cdot \frac{\Delta L}{\lambda} \cdot \frac{dn}{dT} \quad \text{Ex. 1}$$

and is greatly changed to the about $2\pi$. The refractive index of the silicone resin 606 at the room temperature is about 1.4, which is almost the same as that of the silica-based waveguide. The temperature dependence is $dn_{comp}/dT = -4 \times 10^{-4}$, which is about 40 times of that of the silica-based glass with the opposite sign. Therefore, when the length of the portion where the silica-based waveguide is replaced with the siliconee resin 606 is set as a length $dL_{comp}$=about 0.12 mm, which satisfies $$\Delta L \cdot \frac{dn}{dT} - \Delta L_{comp} \cdot \frac{dn_{comp}}{dT} = 0, \quad \text{Ex. 2}$$

the temperature dependence of the optical path difference can be substantially canceled.

The grooves 605 filled with the siliconee resin 606 are divided into multiple grooves in detail in order to prevent the increase of loss that will occur when the waveguide structure is lost due to the presence of the grooves 605. Since a loss that occurs in this structure may lose the loss balance between the I-channel side and the Q-channel side, compensation for the loss is preferable. Therefore, a small gap 541 is formed along the waveguide of the delay circuit 541 into which a delay is not inserted, and the same amount of loss as the one that occurs due to the grooves 605 is added.

The PLC substrates 501 and 502 were fabricated by both the glass film deposition technology, such as the flame hydrolysis deposition (FHD) method, and the micro-fabrication technology, such as reactive-ion etching (RIE). Specifically, a glass layer used as a lower clad layer was deposited on a silicone substrate to make transparent. Then, a core layer having a little higher refractive index than the clad layer was deposited. Thereafter, the core pattern used as an optical waveguide circuit was formed by using the micro-fabrication technology, and a glass film used as an upper clad layer was deposited to make transparent, so that an embedded type optical waveguide was produced. Finally, metal used as a thin film heater was deposited on the upper clad surface by vacuum vapor deposition, and patterning for the metal was performed by the fine-patterning technique, so that a thermo-optic phase shifter was obtained.

The relative difference of the refractive indices of the core and clad of the waveguide is 1.5%. The chip size of the PLC 501 is 6×10 mm, and the chip size of the PLC 502 is 6×15 mm. Although not shown in the drawing, a wiring pattern is formed on the chip to supply a drive current to the individual thin film heaters.

The LN substrate 503 has six LN modulator arrays formed on a Z-cut substrate. The cross-section of the modulator array is shown in FIG. 14C. Waveguide cores 612a and 612b are formed for an LN substrate 611 by titanium diffusion. Center electrodes 613a and 613b are formed on the upper portions of the individual waveguides, and GND electrodes 614a to 614c are arranged around the center electrodes, thereby providing traveling-wave electrodes used for modulation. These waveguide cores 612a and 612b are employed as a pair to serve as a high-speed phase shifter, which is provided for the RZ pulse carver 520, the I-channel modulator 513 and the Q-channel modulator 514. The length of the LN substrate 503 is about 60 mm. Although not shown in the drawing, a high-frequency wiring pattern for the traveling-wave electrodes to propagate a modulated signal is formed on the chip.

The insertion loss that occurred during non-modulation of the optical modulator in example 1 was about 6 dB. As the measurement conditions so that the amount of light transmitted through the optical modulator becomes maximum, (1) the operating points of the I-channel modulator 513 and the Q-channel modulator 514 were adjusted so that the amount of light transmitted through these modulators reach the maximum, (2) the operating point of the RZ pulse carver 520 was adjusted to provide the same intensity for the upper output port and the lower output port of the RZ pulse carver 520, and (3) the $\pi/2$ phase shifter 515 was adjusted so that the maximum optical output to the output port was obtained.

Next, a sine wave with a drive voltage amplitude of $V\pi$ was input to the RZ pulse carver, at 21.5 GHz, which is the same as the clock rate, i.e., the symbol rate, and pseudo random (PRBS) data signals with a drive voltage amplitude of $2V\pi$ were input to the I-channel modulator and the Q-channel modulator, with a shift of several ten bits being provided for the I-channel side and Q-channel side, so that an RZ-(D) QPSK signal of 43 Gbps was generated. The individual operating points and the $\pi/2$ phase shifters were adjusted to the appropriate states. At this time, it was confirmed that the amount of attenuation for the output optical signal relative to the input CW light was about 9 dB, and the increase of loss accompanied by modulation was 3 dB. Therefore, only the fundamental loss of 3 dB occurred in the modulator during 90-degree combining to form a (D) QPSK signal, and it was confirmed that the fundamental loss of 3 dB that occurred at the RZ pulse carver in the conventional case could be avoided.

Following this, the environmental temperature of the modulator was changed in a range of −5 to 75° C., and the value required for adjusting the $\pi/2$ phase shifter was equal to or smaller than $2\pi$. This value is much smaller than the value equal to or grater than $5.3\pi$, which is assumed to be required for adjusting the $\pi/2$ phase shifter when filling of the silicone resin is not performed for the delay circuit 540 of example 1. It is, therefore, confirmed that the structure of the delay circuit 540 in example 1 functions effectively.

For the optical couplers formed on the PLC substrate in example 1, in order to obtain the splitting property with low loss in broadband flatness, Y-splitting circuits were employed as a 1×2 coupler and a 2×1 coupler, and WINC was employed as a 2×2 coupler. However, multi-mode interferometer couplers (MMI) couplers may be employed to provide these couplers. Further, so long as the broadband property is not counted, simple directional couplers may be employed to provide these couplers.

Example 2

Polarization-Multiplexed QPSK Modulator that Includes an RZ Pulse Carver

Figure 15:
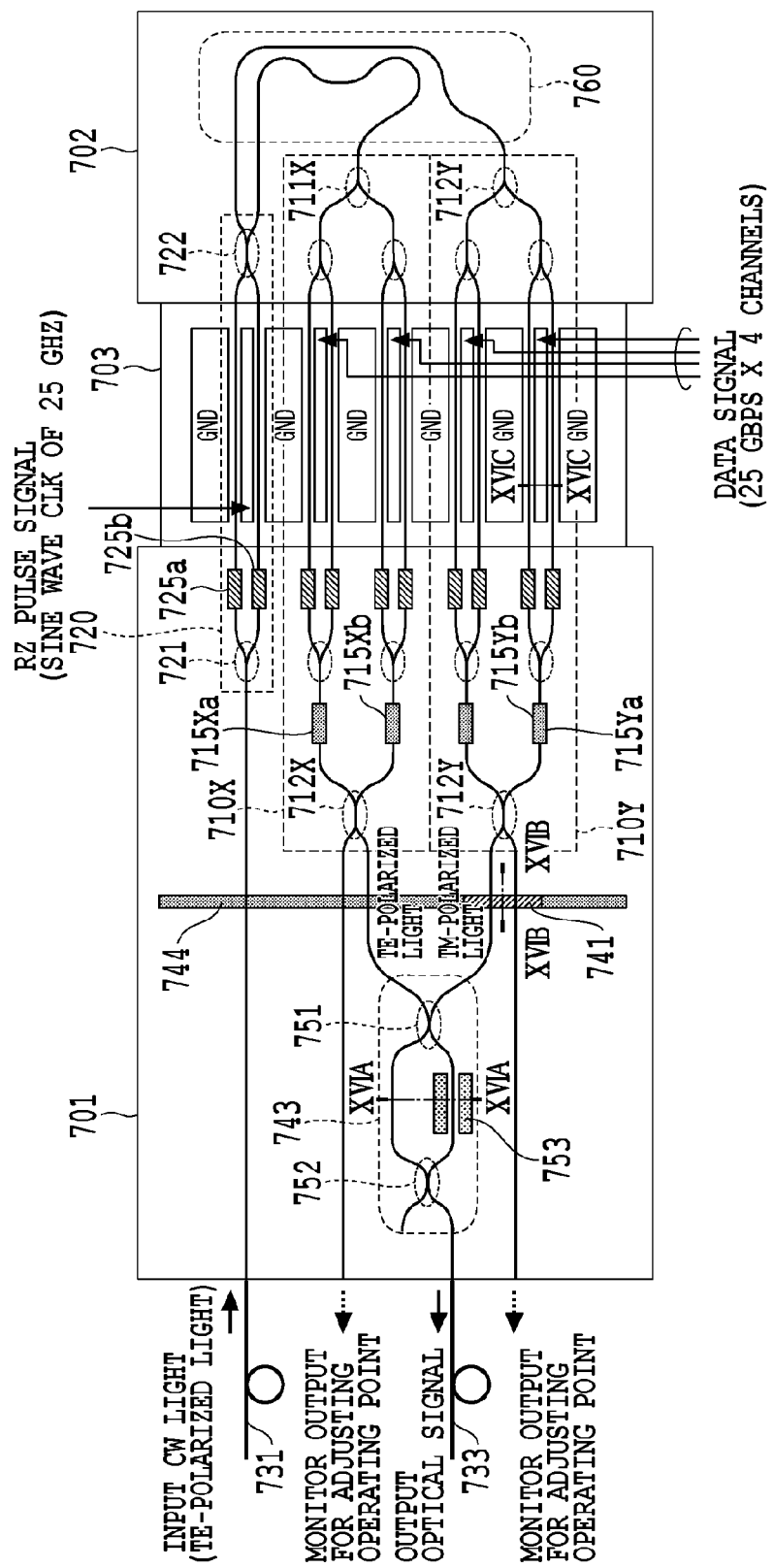
FIG. 15 is a diagram illustrating the configuration of a polarization-multiplexed QPSK modulator that includes an RZ pulse carver according to a second example.

FIG. 15 shows the configuration of a polarization-multiplexed QPSK modulator including an RZ pulse carver according to example 2. An optical modulator for example 2 also employs a hybrid integrated configuration wherein silica-based planar lightwave circuit (PLC) substrates 701 and 702 and an LN substrate 703 on which an LN modulator array is formed, are connected at the end faces. A polarization beam combiner is required for the optical modulator in example 2, and when an LN waveguide is employed for the configuration, a satisfactory property is not obtained. Meanwhile, when a PLC waveguide is employed, a polarization beam combiner having superior polarization orthogonality can be provided.

A 1×2 coupler 721 of a 1×2 RZ pulse carver 720, four 2×1 output-side couplers for an I-channel modulator and a Q-channel modulator, provided each for an X-polarization QPSK modulator 710X and a Y-polarization QPSK modulator 710Y, and 2×2 couplers 712X and 712Y (two couples) for coupling the outputs of the I-channel modulator and Q-channel modulator, are formed on the PLC substrate 701, to which input/output fibers 731 and 733 are connected. One of the output ports of each of the 2×2 couplers 712X and 712Y is connected to a polarization rotator 741 and a polarization beam combiner 743 at the following stages, and the other output port is a monitor output port for adjusting the operating point of the optical modulator. It should be noted that the 2×2 couplers 712X and 712Y are wavelength-independent couplers (WINCs).

A thin-film half-wave plate whose main axis is tilted at 45° is employed as the polarization rotator 741 that converts TE polarized light output by the Y-polarization QPSK modulator 710 into TM polarized light. On the Poincare sphere, the individual polarized beams passed through the half-wave plate tilted at 45° are transformed to the positions by rotating half along the linear polarization axis PQ. Therefore, since the TE polarized light is converted to the TM polarized light, and the TM polarized light is converted to the TE polarized light, this device serves as a TE/TM converter.

Figure 16A:
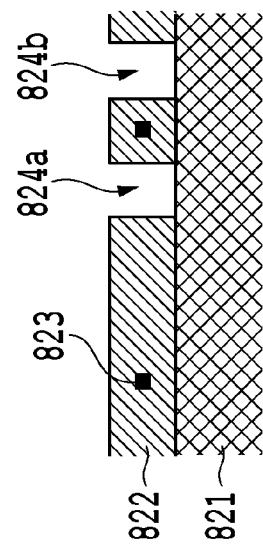
FIG. 16A is a cross-sectional view of a polarization beam combiner according to the second example.
Figure 16B:
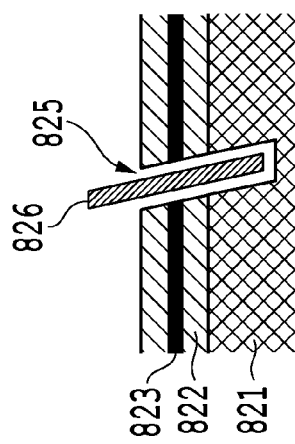
FIG. 16B is a cross-sectional view of a polarization rotator according to the second example.

FIG. 16B shows the cross section of the polarization rotator 741. A half-wave plate 826 is inserted into a groove 825 formed across a waveguide core 823, and is fixed using an adhesive, for which the refractive index matching has been performed. The groove 825 is inclined across the waveguide at eight degrees to prevent light reflected from the half-wave plate 826 from being propagated as return light. It should be noted that the angle of the polarization-maintaining input fiber is adjusted, so that the optical signal input to the PLC substrate 701 becomes TE polarized light.

The polarization beam combiner 743 is an interferometer including a stress-releasing groove 753 formed in one of the two arm waveguides, held between the two WINC 2×2 couplers 751 and 752. When the process for increasing the transparency of glass at high temperature has been performed for the silica-based waveguide, generally strong compression stress is generated due to a difference between the thermal expansion coefficients of the silicone substrate and silica glass, and thus, birefringence occurs. Since birefringence of the stress-releasing groove 753 is very small value due to stress releasing, the length of the stress-releasing groove 753 and the waveguide length difference of the interferometer need only be adjusted, so that it can be designed that, for example, a path length difference for the TE polarized light is zero, and a path length difference for the TM polarized light is a length equivalent to half a wavelength. In the thus designed interferometer, the TE polarized light is transmitted along the cross-path, and the TM polarized light is transmitted along the bar-path, and therefore, the TE polarized signal input at the upper input port and the TM polarized signal input at the lower input port can be output together to the lower output port. Therefore, such an interferometer serves as a polarization beam combiner.

FIG. 16A shows the cross section of the polarization beam combiner 743. The interferometer includes an optical waveguide, wherein a waveguide clad material 822 and a waveguide core 823 are provided on a silicone substrate 821. Grooves 824a and 824b are formed to the silicone substrate 821 deeper than the waveguide core 823, and are made deeper in parallel to the waveguide core 823 to form the stress-releasing groove 753.

A 2×2 coupler 722 for the 1×2 RZ pulse carver 720, four 1×2 input-side couplers for the I-channel modulator and the Q-channel modulator, each provided for the X-polarization QPSK modulator 710X and the Y-polarization QPSK modulator 710Y, and 1×2 coupler 711X and 711Y (two couplers) for splitting the light to the output port of the I-channel modulator and the Q-channel modulator are mounted on the PLC substrate 702. It should be noted that a wavelength-independent coupler (WINC) is employed as the 2×2 coupler. Further, a folded waveguide 760 that connects the 1×2 RZ pulse carver 720 to the X-polarization QPSK modulator 710X and Y-polarization QPSK modulator 710Y is designed to have an equal length without a relative delay.

For the input side of the 1×2 RZ pulse carver 720 and the output sides of the I-channel modulators and the Q-channel modulators of the X-polarization QPSK modulator 710X and the Y-polarization QPSK modulator 710Y, thermo-optic phase shifters (ten units) are provided along the two arm waveguides of each modulator in order to adjust operating points. Further, for the output sides of the X-polarization QPSK modulator 710X and the Y-polarization QPSK modulator 710Y, thermo-optic phase shifters 715 (four units) are arranged, which serve as π/2 phase shifters that combine the I-channel and Q-channel optical signals of the DQPSK modulators by adjusting the relative phase shift to 90°. An insulating groove for reducing power consumption of the thermo-optic phase shifters is formed in the clad portions on both sides of the thin-film heater of each thermo-optic phase shifter (not shown in FIG. 15).

According to example 2, phase shifters used for adjusting the operating points provided for the individual modulators and π/2 phase shifters, are mounted on the PLC substrate 701. This is because the process for forming the insulating groove in the thermo-optic phase shifter can also include the process for forming the stress-releasing groove in the polarization beam combiner, and therefore, the chip fabrication cost can be reduced. Although not shown in the drawing, an electric wiring pattern is formed on the chip to supply a drive current to the individual thin-film heaters.

Figure 16C:
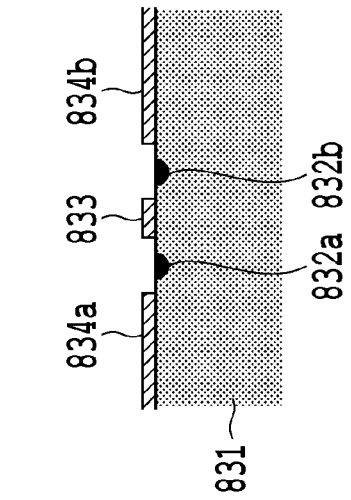
FIG. 16C is a cross-sectional view of a modulator array according to the second example.

The LN substrate 703 includes ten LN modulator arrays formed on an X-cut substrate. The cross section of the modulator array is shown in FIG. 16C. Waveguide cores 832a and 832b are formed in the LN substrate 831 by titanium diffusion. A center electrode 833 is formed between the waveguides, and GND electrodes 834a and 834b are formed around the center electrode 833, thereby providing a traveling-wave electrode for modulation. When the waveguide cores 832a and 832b are employed as a pair, a high-speed phase shifter is provided for the I-channel modulator and for the Q-channel modulator of each of the X-polarization QPSK modulator 710X and the Y-polarization QPSK modulator 710Y. Although not shown in the drawings, a high-frequency wiring pattern for the high-frequency electrodes is formed on the chip to transmit a modulated signal to the center electrode.

The insertion loss that occurred during non-modulation of the optical modulator in example 2 was about 8 dB. As the measurement conditions so that the amount of light transmitted through the optical modulator becomes maximum, (1) the operating points of the X-polarization QPSK modulator 710X and Y-polarization QPSK modulator 710Y and the π/2 phase shifter were adjusted so that the amount of light transmitted through these modulators reach the maximum, and (2) the operating point of the RZ pulse carver 720 was adjusted to provide the same intensity for the upper output port and the lower output port of the RZ pulse carver 720. Further, a property of the polarization beam combiner could be obtained that the polarization crosstalk was equal to or lower than −30 dB.

A CLK signal of a sine wave was input to the RZ pulse carver 720 with a drive voltage amplitude of Vπ, at a clock rate (symbol rate) of 25 GHz, and pseudo random (PRBS) data signals with a drive voltage amplitude of 2Vπ were input to the I-channel modulators and the Q-channel modulators of the X-polarization QPSK modulator 710X and the Y-polarization QPSK modulator 710Y. In this case, a shift of several ten bits are provided for the I-channel side and Q-channel side, and a shift of several ten bits are provided between X-polarized and Y-polarized light, so that an RZ-polarization multiplexed QPSK signal of 100 Gbps was generated. The individual operating points and the π/2 phase shifters were adjusted in the appropriate states. At this time, the amount of attenuation for the output optical signal relative to the input CW light (the total of TE polarized light/TM polarized light) was about 11 dB, and the increase of loss accompanied by modulation was 3 dB. Therefore, only the fundamental loss of 3 dB occurred in the modulator during 90-degree combining to form a QPSK signal, and the fundamental loss of 3 dB that occurred at the RZ pulse carver in the conventional case can be avoided.

In example 2, the monitoring method described in the second embodiment for a shift of the operating point and a shift of orthogonality is employed. Specifically, one of the output of the 2×2 coupler 712X of the X-polarization QPSK modulator 710X and one of the outputs of the 2×2 coupler 712Y of the Y-polarization QPSK modulator 710Y are employed as monitor outputs, and the drive bias point for the RZ pulse carver 720 is adjusted, so that the same temporal mean value is obtained for the intensities of the two output optical signals.

Here, the two monitor output values are not obtained by directly watching the output value of the RZ pulse carver 720, and are the values of loss of the circuit components, such as the X-polarization QPSK modulator 710X, the Y-polarization QPSK modulator 710Y and the polarization rotator 741, that are provided until the monitor output location. Since these values of loss are varied depending on the devices, a variance of these losses is measured in advance, and is subtracted before the actual comparison of the temporal mean values of the optical light intensities is performed.

For example 2, the birefringence adjustment using the stress-releasing groove is employed to provide the polarization beam combiner 743. However, another method may be employed, such as a method for employing form birefringence which occurs in a case wherein a transversely wide and flat waveguide structure is employed for a waveguide, or a method whereby a half-wave plate is inserted into a waveguide at an angle of 0° or 90° relative to the main axis to employ the birefringence of the half-wave plate.

The above described examples have been described by employing an LN substrate and a silica-based PLC substrate as a hybrid integrated set. This is because the LN waveguide has high EO effects and is provided based on the primary waveguide technology for a high-speed modulator, while the silica-based waveguide is a passive waveguide with the lowest loss, and the set of these substrates is superior to provide a complicated modulator with low loss. However, of course, there is no difference by using a set of waveguides formed of other types of materials, for example, a set of a waveguide having the EO effect, formed of a multi-component oxide material or a semiconductor material, and a passive waveguide formed of silicone or a polymer material, in order to obtain the same effects as described in the examples.

The invention claimed is:

1. An optical modulator characterized by comprising:
a 1×2 RZ pulse carver wherein optical phase shifters used for modulation are arranged along two arm waveguides held between a 1×2 coupler and a 2×2 coupler;
two interferometric modulators connected respectively to two output ports of the 2×2 coupler; and
a 2×1 combining coupler for combining the outputs of the interferometric modulators.

2. The optical modulator according to claim 1, wherein a pulsed signal used to drive the 1×2 RZ pulse carver is a pulsed signal having an amplitude of Vπ and a repetition period CLK, wherein a drive waveform f(t) satisfies a relationship whereof $$f(t-\text{CLK}/2)=-f(t).$$

3. The optical modulator according to claim 2, wherein the pulsed signal is a sine wave.

4. The optical modulator according to claim 1, wherein the pulsed signal used to drive the 1×2 pulse carver is a pulsed signal having an amplitude of 2Vπ and a repetition period CLK, wherein when a drive waveform f(t) is $$F(t)=\text{Abs}\{f(t)-V\pi/2\}-V\pi/2, \text{ or}$$

$$F(t)=\text{Abs}\{f(t)+V\pi/2\}-V\pi/2,$$

the drive waveform f(t) satisfies a relationship whereof $$F(t-\text{CLK}/2)=-F(t).$$

5. The optical modulator according to claim 4, wherein the pulsed signal is a triangular wave with an amplitude center of +Vπ/2 or −Vπ/2.

6. The optical modulator according to claim 1, wherein the interferometric modulator is a data modulator including phase shifters used for modulation that are arranged along two arm waveguides held between a 1×2 coupler and a 2×1 coupler, and
the optical modulator further comprises:
a delay circuit wherein a propagation delay time difference between output of the 2×2 coupler of the 1×2 RZ pulse carver and input of the 2×1 combining coupler is (k+0.5) times (k is an integer) a pulse carving period; and a π/2 phase shifters for adjusting to 90° a relative optical phase difference for output light from the individual interferometric modulators during non-modulation.

7. The optical modulator according to claim 1, wherein:

the 2×1 combining coupler is a polarization beam combiner performing polarization combining for a TE polarized light input from one input port and a TM polarized light input from the other input port;

the interferometric modulator is nest-Mach-Zehnder interferometric modulator including Mach-Zehnder interferometric modulators that are arranged along two arm waveguides held between a 1×2 coupler and a 2×1 coupler and includes a TE/TM polarization converter connected to one output of the Mach-Zehnder interferometric modulator; and each of the Mach-Zehnder interferometric modulators are data modulators for each of which phase shifters are arranged, along two arm waveguides held between a 1×2 coupler and a 2×1 coupler, and include a π/2 phase shifters for adjusting to 90° a relative optical phase for output light from the 2×1 coupler of the individual Mach-Zehnder interferometric modulators during non-modulation.

8. The optical modulator according to claim 7, further comprising a delay circuit for which a propagation delay time difference between output of the 2×2 coupler of the 1×2 RZ pulse carver and input of a splitting coupler of each of the interferometric modulators is (k+0.5) times (k is an integer) a pulse carving period.

9. The optical modulator according to claim 7, wherein a propagation delay time difference between output of the 2×2 coupler of the 1×2 RZ pulse carver to the polarization beam combiner is k times of the pulse carving period.

10. The optical modulator according to claim 6, wherein, where a delay length of the delay circuit is ΔL, and temperature dependence of a refractive index of a material to be replaced for an optical waveguide is dn/dT, the material has a length $dL_{comp}$ that satisfies $$\Delta L \cdot \frac{dn}{dT} - \Delta L_{comp} \cdot \frac{dn_{comp}}{dT} = 0.$$

11. The optical modulator according to claim 1, further comprising optical output monitoring devices provided for individual outputs of the interferometric modulator.

12. The optical modulator according to claim 11, wherein an operating point of the 1×2 RZ pulse carver is adjusted so equal to a temporal mean value for light intensities indicated by the individual optical output monitoring devices.

13. The optical modulator according to claim 1, further comprising an optical output monitoring device provided for one or both of the outputs of the 2×2 coupler of the 1×2 RZ pulse carver.

14. The optical modulator according to claim 13, wherein an operating point of the 1×2 RZ pulse carver is adjusted so equal to a temporal mean value for light intensities indicated by the optical output monitoring devices provided at the individual outputs of the 2×2 coupler.

15. The optical modulator according to claim 11, wherein a very small dither signal is superimposed on a bias value of an operating point of the 1×2 RZ pulse carver, and the operating point of the 1×2 RZ pulse carver is adjusted, so that the amount of change in the optical intensity indicated by the optical output monitoring devices that is based on the dither signal reaches a maximum.

16. The optical modulator according to claim 8, wherein, where a delay length of the delay circuit is ΔL, and temperature dependence of a refractive index of a material to be replaced for an optical waveguide is dn/dT, the material has a length $dL_{comp}$ that satisfies $$\Delta L \cdot \frac{dn}{dT} - \Delta L_{comp} \cdot \frac{dn_{comp}}{dT} = 0.$$

17. The optical modulator according to claim 13, wherein a very small dither signal is superimposed on a bias value of an operating point of the 1×2 RZ pulse carver, and the operating point of the 1×2 RZ pulse carver is adjusted, so that the amount of change in the optical intensity indicated by the optical output monitoring devices that is based on the dither signal reaches a maximum.

* * * * *